US009691222B2

(12) United States Patent
Acres et al.

(10) Patent No.: US 9,691,222 B2
(45) Date of Patent: Jun. 27, 2017

(54) ELECTRONIC WAGERING

(71) Applicant: Patent Investment & Licensing Company, Las Vegas, NV (US)

(72) Inventors: John F. Acres, Las Vegas, NV (US); Warren White, Reno, NV (US); Mark N. Dailey, Las Vegas, NV (US); William Dale Hermansen, Reno, NV (US); Anthony Morelli, Reno, NV (US); Alex White, Sparks, NV (US); Cyrus A. Luciano, Reno, NV (US); John G. Schmitz, Henderson, NV (US); Andrew King, Las Vegas, NV (US); Patrick B. Ferguson, Las Vegas, NV (US)

(73) Assignee: Patent Investment & Licensing Company, Las Vegas, NV (US)

( * ) Notice: Subject to any disclaimer, the term of this patent is extended or adjusted under 35 U.S.C. 154(b) by 156 days.

(21) Appl. No.: 13/621,528

(22) Filed: Sep. 17, 2012

(65) Prior Publication Data

US 2014/0080564 A1 Mar. 20, 2014

(51) Int. Cl.
*A63F 13/30* (2014.01)
*G07F 17/32* (2006.01)

(52) U.S. Cl.
CPC ........ *G07F 17/3244* (2013.01); *G07F 17/329* (2013.01); *G07F 17/3225* (2013.01); *G07F 17/3234* (2013.01); *G07F 17/3288* (2013.01)

(58) Field of Classification Search
CPC ......................... G07F 17/3234; G07F 17/3269
USPC ..... 463/25, 37, 40–42, 29, 31–33; 705/7.22, 705/7.25, 22, 28, 307
See application file for complete search history.

(56) References Cited

U.S. PATENT DOCUMENTS

| | | | | |
|---|---|---|---|---|
| 7,470,183 | B2 | 12/2008 | Wishart | |
| 7,611,407 | B1 * | 11/2009 | Itkis et al. | 463/29 |
| 8,157,635 | B2 | 4/2012 | Hardy et al. | |
| 2002/0098883 | A1 * | 7/2002 | Packes et al. | 463/20 |
| 2007/0243928 | A1 * | 10/2007 | Iddings | 463/26 |
| 2009/0170594 | A1 | 7/2009 | Delaney et al. | |
| 2012/0315978 | A1 * | 12/2012 | LeMay et al. | 463/25 |

* cited by examiner

*Primary Examiner* — David L Lewis
*Assistant Examiner* — Ross Williams
(74) *Attorney, Agent, or Firm* — Marger Johnson

(57) ABSTRACT

The present system incorporates mobile computing devices to play games, such as electronic pull-tabs, in a plurality of venues, each having a local wireless network. Each network communicates with a central system that generates decks of game outcomes and associated awards. All wagers and awards for each game are tracked on the central system, which also provides each game award and associated outcome from a deck stored on the central system.

13 Claims, 42 Drawing Sheets

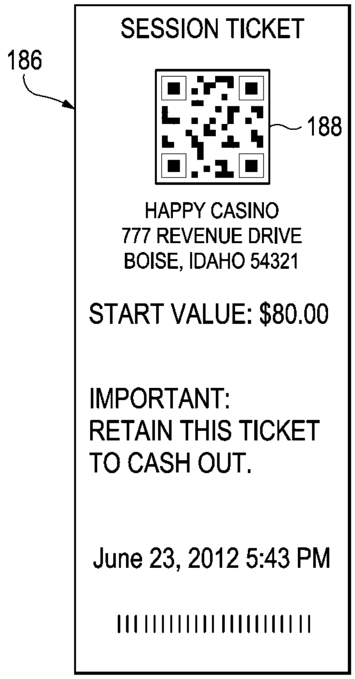
FIG. 36
FIG. 37
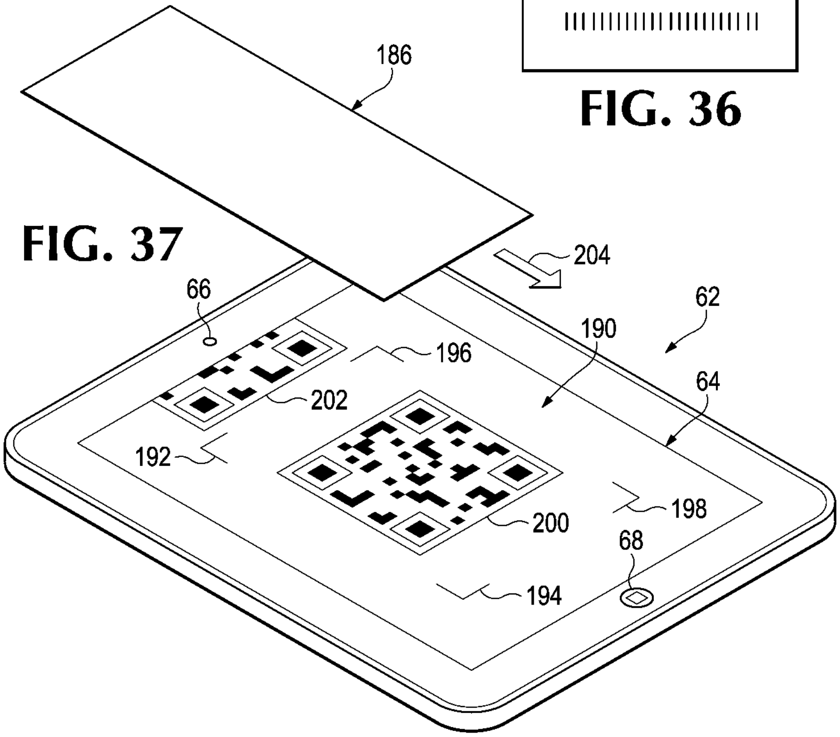

ELECTRONIC WAGERING

BACKGROUND OF THE INVENTION

1. Field of the Invention

The present invention relates generally to implementing wagering games via an electronic network and more particularly to implementing such games via computing devices used by a player.

2. Description of the Related Art

Some types of wagering games are known as reveal games because the outcome of the game is known when the wager is placed. As a result, the point of the game is to disclose the outcome to the player in a manner that creates interest. One such type of game uses a pull-tab ticket, sometimes referred to a break-open card. Some states authorize gaming to be conducted by and for the benefit of charitable organizations, and sales of pull-tab tickets are a popular type of charitable gaming.

A pull-tab ticket is typically a multi-layered paper ticket containing symbols hidden behind perforated tabs on the top layer on one side of the ticket. The other side of the ticket lists winning combinations of symbols, the number of tickets that contain each winning combination, and the cash payout for each combination. Sometimes the total number of tickets in the game is also disclosed.

Tickets may be sold for any amount, but typical costs vary from $0.25 to $5.00. Prizes may also be any amount but usually range up to $1,000. After a player purchases a pull-tab ticket, he or she pulls the perforated tab to reveal the symbols. If there is a combination of symbols that matches one of the listed winning combinations, the player may redeem the ticket with the seller to collect the prize.

A game manager is responsible for selling pull-tab tickets. The manager must account for money received and paid to a variety of people and entities. These include revenues for tickets sold and prizes redeemed when a winning ticket is presented, and often also includes money paid to taxing authorities, to the venue hosting the game, and to the manager. These games are usually operated in small venues such as restaurants and bars according to state charitable-gaming regulations.

One of the costs of operating a pull-tab game is purchasing boxes of tickets. Each box includes a predefined number of winning combinations, an award amount associated with each winning combination, a total number of tickets, and a sales price for each ticket. As a practical matter, the total number of tickets for each box is limited due to the difficulty of managing and accounting for a large number of tickets.

Turning now to FIG. 1, indicated generally at 10 is a prior art paper pull-tab ticket. The ticket includes at least two layers of paper, an upper layer 12 and a lower layer 14, which is visible beneath an opened tab 16. The tab is formed via perforations or cuts in layer 12 that define a border 18 of the tab, like a border 20 of a second unopened tab 22. Three additional unopened tabs appear beneath tab 22. Each of the tabs is marked OPEN HERE.

A pay table printed on the backside of ticket 10 is shown in FIG. 2. This pay table is printed on the other side of lower layer 14 from that visible in FIG. 1. The number of each of the 6 winning combinations in the box from which ticket 10 was sold is typically printed along side each winning combination, although not visible in FIG. 2. In addition, the ticket may include the total number of tickets in the box from which the ticket was sold, or this information may be provided separately from the ticket. And in some instances, players are informed of the total number of tickets sold from the box and/or the number of tickets from the box remaining to be sold.

In operation, a game manager sells ticket 10 to a player for a predetermined amount. When received by the player, each of the tabs remains unopened, i.e., the portion of layer 12 that is perforated or cut to define each tab border remains intact. As a result, each of the tabs is in the position shown for tab 22 in FIG. 1. After the player purchases the ticket, he or she bends it slightly or pulls at the border of one of the tabs to tear it from its connection to layer 12 about three sides of the tab perimeter to open it to the position shown for tab 16.

So doing reveals three symbols that are printed on layer 14 beneath each of the unopened tabs. When these symbols match one of the winning combinations shown in FIG. 2, typically three-of-a-kind, the player returns the opened ticket to the seller and redeems it for the award associated with the symbol combination beneath the tab. On the other hand, when none of the symbols beneath the tab correspond to a winning combination, the tab is not redeemable and may be discarded.

It would be desirable to implement pull-tab and other types of gaming using an electronic network of computing devices via which games are played.

BRIEF DESCRIPTION OF THE DRAWINGS

FIG. 36 is a top plan view of a session voucher.

FIG. 37 is a perspective view of the session voucher of FIG. 36 being scanned on a player terminal.

DETAILED DESCRIPTION

Figure 3:
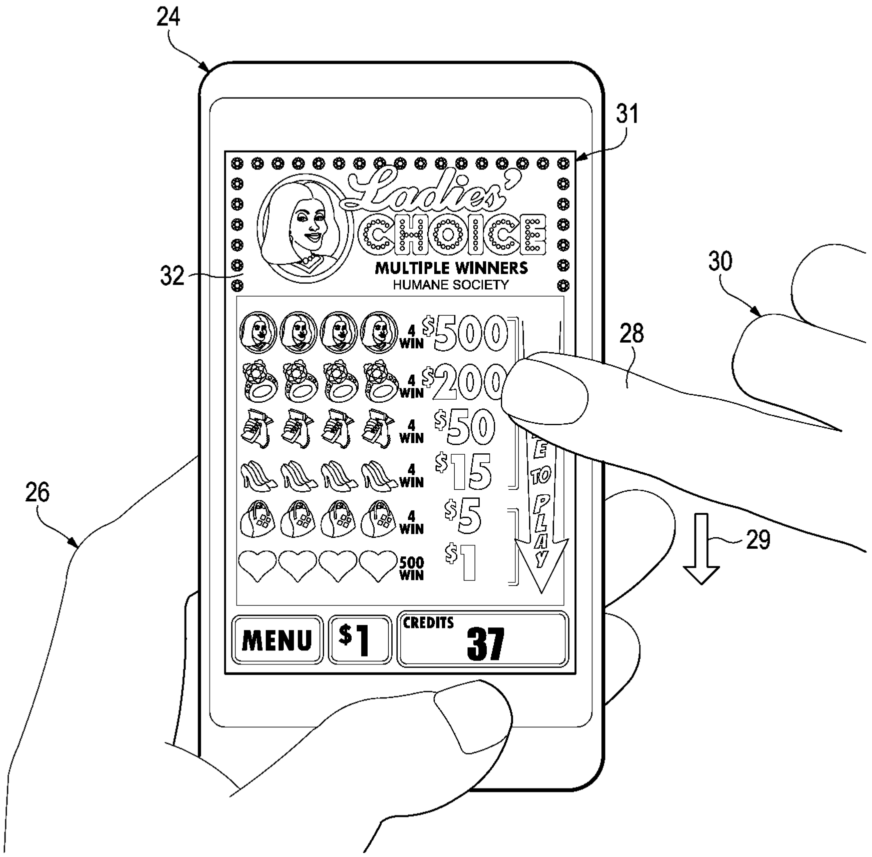
FIG. 3 is a plan view of a player playing an electronic pull-tab game on a mobile computing device having a touch screen for providing input commands.

Turning now to FIG. 3, indicated generally at 24 is a mobile computing device 24 upon which a game is implemented—in this case a game called Ladies Choice. Before considering the technical aspects of how this invention may be implemented, consideration will first be given to the game itself, how it appears to the player, and how the player interacts with the game and with a manager of the game.

In the present embodiment of the invention, device 24 comprises an iPod™, which is made by Apple Inc. Any suitable computing device may be so used. In FIG. 3 device 24 is being held in a player's left hand 26. A forefinger 28 on the player's right hand 30 is shown in motion in the direction of an arrow 29 on a touch screen 31, which has a display 32 thereon, on device 24. As is known in the art, touch screens can be implemented in a variety of ways, each of which changes a state that the device is monitoring. Some screens rely on sound or light, and others use capacitive material, which holds a charge that changes when touched. Some touch screens are comprised of capacitors arranged according to a coordinate system, which is used in a known manner to determine location and direction of movement of a finger touching the screen. This is accomplished by sending signals that result from changing capacitance to a processor in device 24, which interprets the input from a touch and/or finger movement. A finger touch combined with movement along an axis on the screen is referred to as a screen swipe. Any technique that facilitates touching and swiping as described herein may be used.

Figure 4:
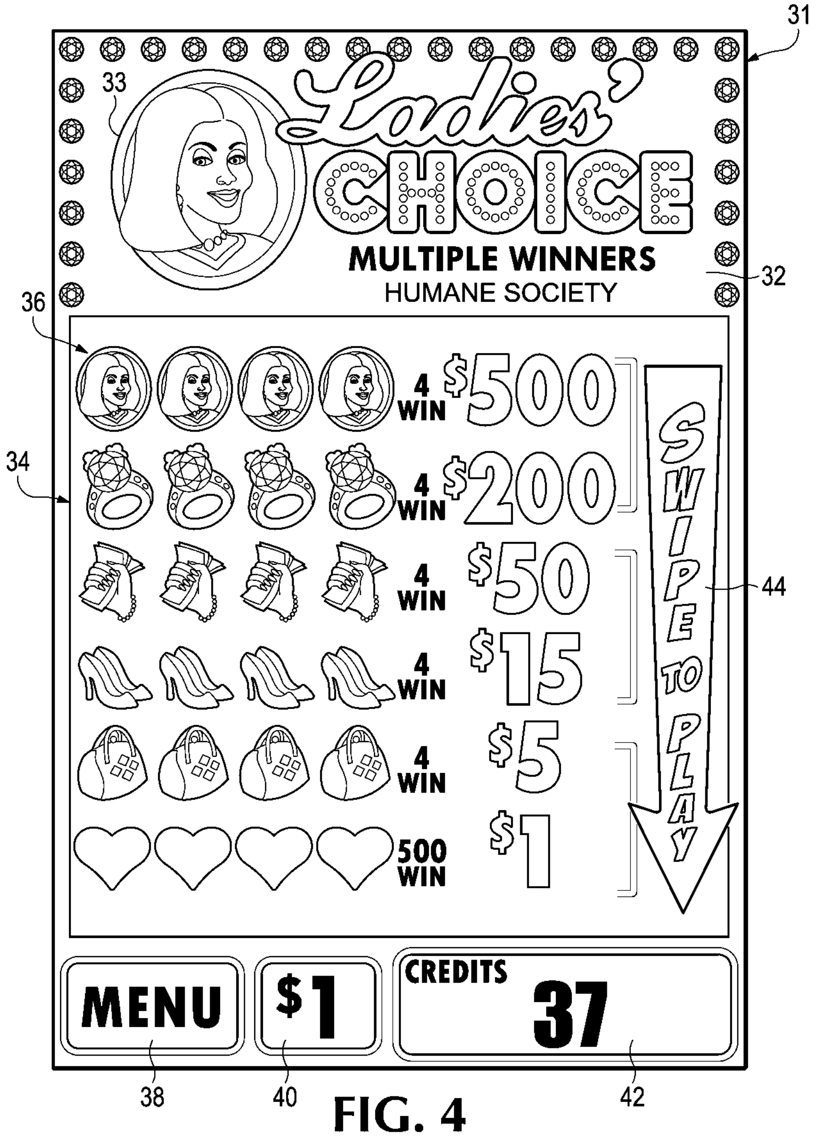
FIG. 4 is an enlarged view of the screen display in FIG. 2.

FIG. 4 is an enlarged view of screen 31 with finger 28 off the screen to reveal all of a display 32 on screen 31. A woman's portrait 33 appears at the top of display 32. Because the present implementation happens to be in conjunction with charitable gaming, the name of the charity receiving the benefit appears adjacent portrait 33. The display includes a pay table 34, which indicates the symbol combinations that comprise a win and the number of such combinations in a deck, which is the total number of possible outcomes and awards associated with a predetermined number of game plays. The pay table also includes an award amount for each symbol combination. In the present embodiment of the invention, the deck comprises a total of 7,500 cumulative game plays by all of the players at a single location. In the present embodiment of the system, once a deck is opened, i.e., the first outcome and associated award is transmitted to the game being played, it must remain associated with the venue where the first card was purchased via the player's wager until the deck is either closed or the cards are all used. The deck, its construction, and how it is used is described in more detail in a later section.

A first row 36 of pay table 34 indicates that the combination of four symbols of a woman's head appear four times in the deck, and each time the combination appears, the player wins $500. (This top-paying symbol corresponds to the portrait 33 featured at the top of the display.) Similarly, in the next row down, the combination of four rings appear four times with each win receiving a $200 award. In the last row, the combination of four hearts appears 500 times, with each occurrence resulting in an award of $1.

At the bottom of display 32, there is a touch-sensitive menu button 38. A denomination panel 40, also at the bottom of the display, is not touch sensitive. Rather, it indicates the denomination of the game, i.e., how much is wagered for each play of the game. In this case, each play costs $1. In the present embodiment, this indication does not change during game play, but other embodiments could permit selecting different denominations. An adjacent credit meter 42 indicates the number of remaining credits that the player has on the game. In the present embodiment, this equates to the number of dollars because it is a $1 wager. But this meter could indicate the remaining dollars, which would be different from the number of credits for other wager denominations. These credits are initially applied to the game as a result of the player depositing an initial amount to begin game play. Any wins during play are applied to the credit meter. And the total amount on the meter is returned to the player at the conclusion of game play—more about how credits are applied and redeemed shortly.

Finishing the description of display 32 on screen 31, a downwardly directed arrow 44 appears on the right side of the display. As can be seen, the words SWIPE TO PLAY appear on arrow 44.

Figure 5:
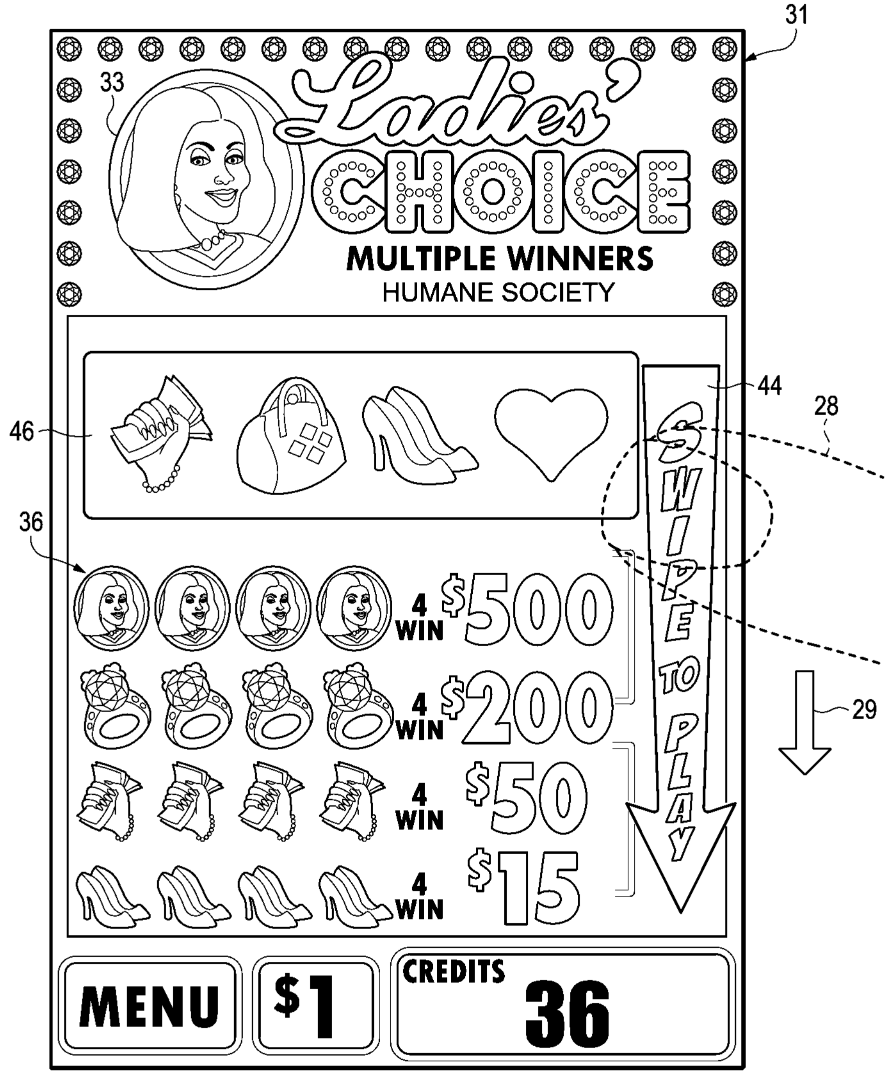
FIGS. 5-7 are views similar to FIG. 3 showing sequential views of game play responsive to touch screen commands.
Figure 6:
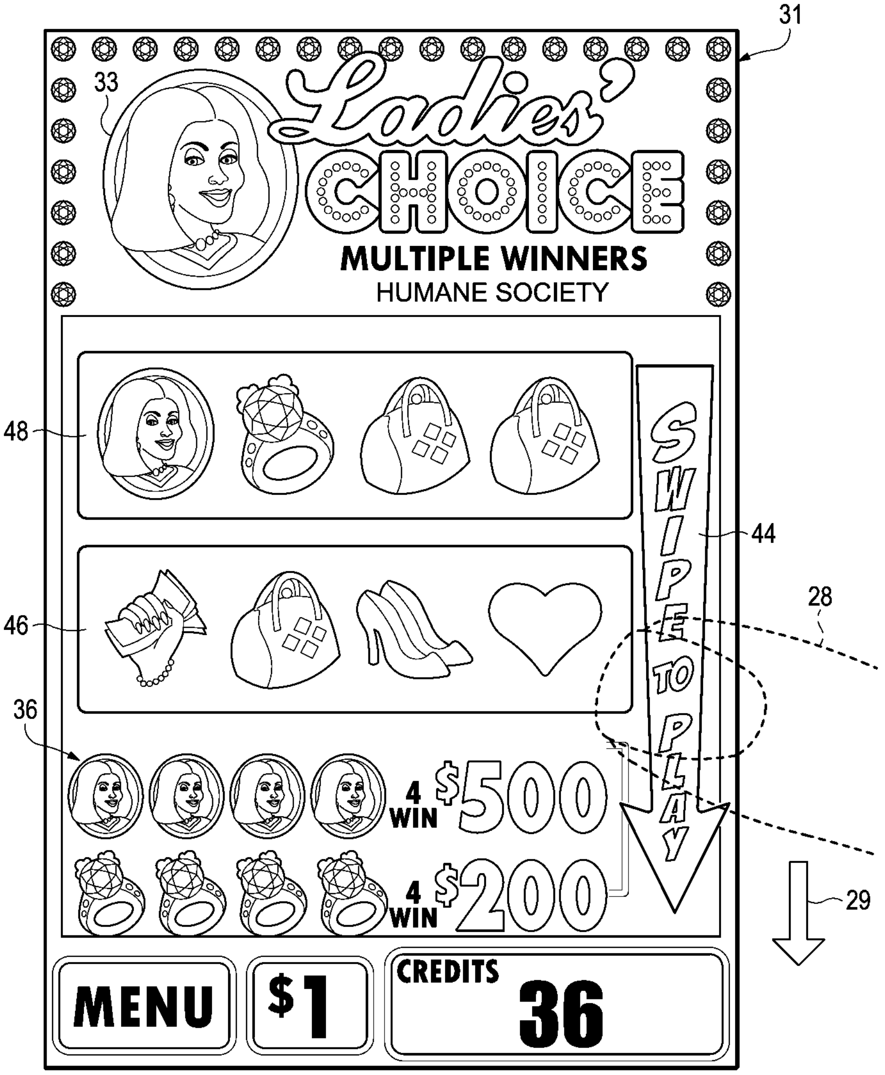
Figure 7:
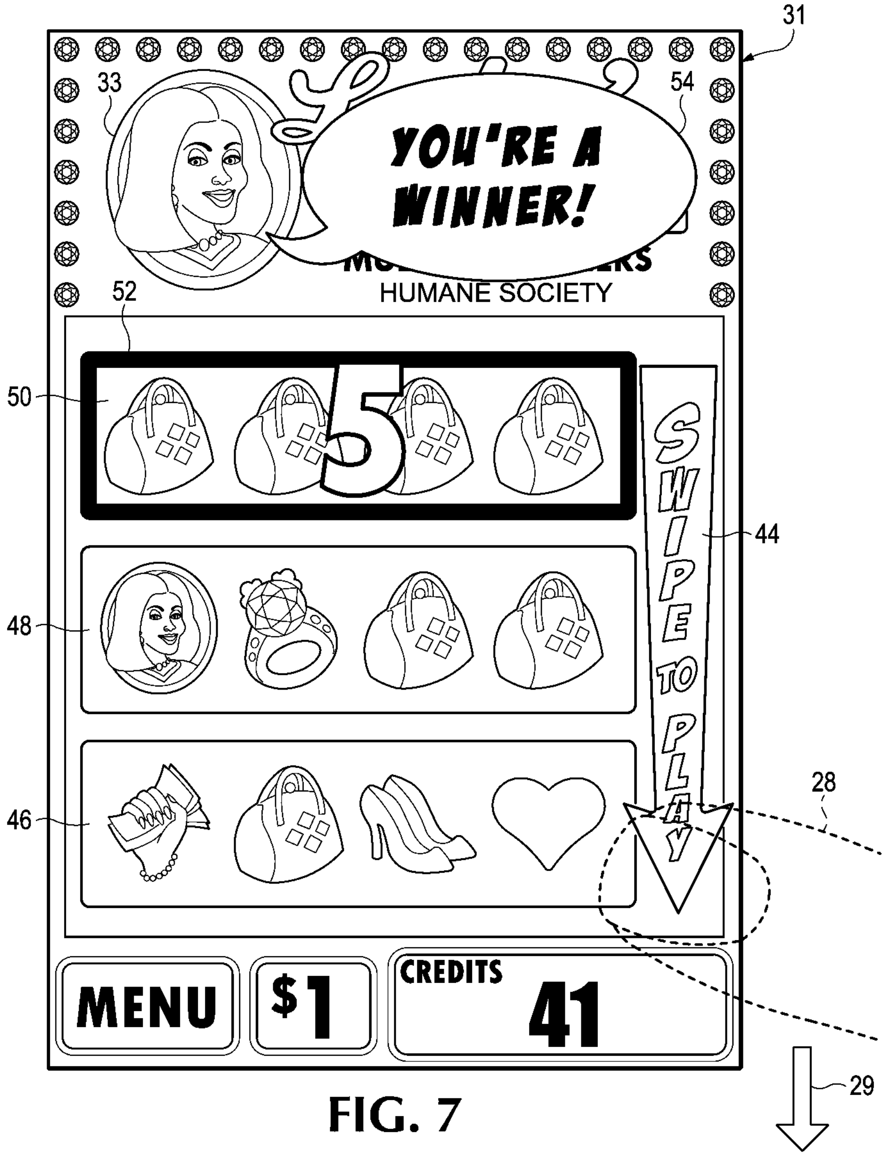

FIGS. 5-7 depict a single play of the game, which begins when the player uses a finger to touch arrow 44 anywhere in roughly the upper half of the arrow. As instructed by the arrow itself, a downward swipe of the finger results in game play. In FIG. 5, finger 28 was initially placed near the uppermost portion of arrow 44. In FIG. 5, the swipe has begun with the finger moving from the top of the arrow to the position shown. Such movement has revealed a first row 46 of symbols. Downward finger movement on the arrow and revelation of row 46 coincide with downward movement of pay table 34. As can be seen in FIG. 5, the bottom two rows of the pay table are no longer visible and each of the other rows has moved down two rows. As all this movement occurs, the impression that the player has is one of lowering the pay table to reveal row 46, all of this being accomplished by gradually changing screen display responsive to touch-screen input.

In FIG. 6, further downward movement of finger 28 on arrow 44 reveals a second row 48 of symbols. In the present embodiment, after the first row is revealed, it moves downwardly as the second row appears. This can be appreciated by observing the movement of row 46 in FIGS. 5-7, the movement of row 48 in FIGS. 6-7, and the appearance of row 50 in FIG. 7. Alternatively, each symbol row 46, 48, 50 can maintain its place where initially revealed. In this alternative, the row order in FIG. 7 would be from top to bottom: row 46, row 48, row 50.

Another noteworthy feature is that finger 28 can rapidly swipe downwardly on arrow 44 thus moving from the display of FIG. 4 to that of FIG. 7 in a fraction of a second. In this mode, each symbol row is quickly revealed, one after the other as described above.

The player may alternatively slowly move his or her finger down the arrow while maintaining contact with the screen. In this mode of play, the player may stop and hold his or her finger as shown, e.g., in FIG. 5. So long as this position is held, i.e., finger on the screen in the location immediately after row 46 is revealed, the display on screen 31 will be held as shown in FIG. 5. What is more, if the finger is lifted from the screen the display, e.g., from the position shown in FIG. 5, row 46 remains revealed and no further game activity takes place until the finger again touches the screen on the arrow and swipes further downwardly. This mode of operation gives the player the opportunity to more slowly reveal—and to hold and inspect—each of the symbol rows 46, 48, 50 as it is revealed.

This slow motion reveal can be repeated for each of the rows, i.e., stopping finger movement on the screen or lifting the finger from the screen after each row is revealed holds the display as shown in FIG. 5 or FIG. 6 or FIG. 7. Once the finger is at the bottom of arrow 44, all rows are revealed, whether this has been done quickly or slowly. For so long as finger 28 remains on screen at the bottom of arrow 44, as shown in FIG. 7, all three rows remain displayed.

Once, however, the finger is lifted from the screen after all rows are displayed, one of two things happen depending on whether any of the revealed rows comprise a winning combination of symbols, i.e., four-of-a-kind. In the view of FIG. 7, row 50 comprises a winning combination. As can be seen from pay table 34 in FIG. 4, this combination pays $5. In FIG. 7, immediately after finger 28 lifts from the screen, the winning combination is highlighted with an enhanced border 52, and a balloon 54 appears adjacent portrait 33. The balloon includes the words YOU'RE A WINNER! This $5 win is applied to credit meter 42 in FIG. 4 thus incrementing it by $5. After a brief pause to permit the player a moment of celebration, the display depicted in FIG. 4, except for menu button 38, denomination panel 40, and credit meter 42, moves downwardly from the top of the screen thereby covering two rows of losing combinations and the row of winning combinations and presents the player with an opportunity to play the next round. In short, the screen again appears as depicted in FIG. 4 and the player is ready for another round as described above.

Figure 1:
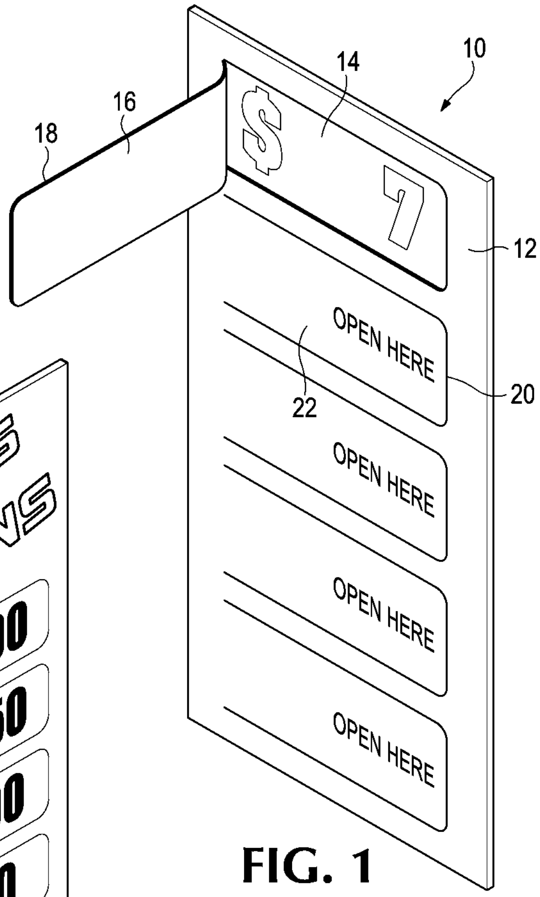
FIG. 1 PRIOR ART
FIG. 1 is a perspective view of the front of a prior art pull-tab ticket having one of its tabs pulled.
Figure 2:
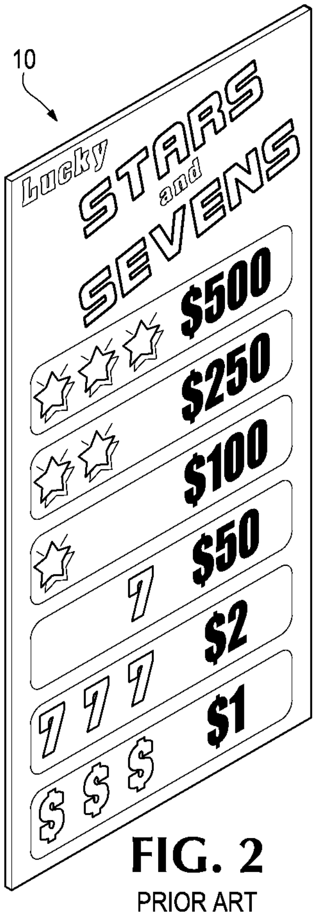
FIG. 2 PRIOR ART
FIG. 2 is a plan view of the ticket of FIG. 1 showing the symbol combinations that provide an award, the amount of each award, and the number of such awards.

If, however, there is no winning combination in the three rows, once all three are revealed and finger 28 lifts from the screen, the display depicted in FIG. 2, except for menu button 38, denomination panel 40, and credit meter 42, moves downwardly from the top of the screen thereby covering the three rows of losing combinations and presents the player with an opportunity to play the next round. Because this is a $1 game, the credit meter is decremented by the wager, i.e., by $1.

In an alternative embodiment, whether or not any of the revealed rows comprise a winning combination of symbols, either or both of the game responses described above may occur at the end of the swipe, even before the finger is lifted from the screen.

Still another noteworthy feature is sound effects. One such effect accompanies the appearance of each row. In the present embodiment, an audio effect generated by device 24 comprises a drip sound, each drip sound varying slightly in pitch and tone quality from the preceding one. Downward swiping slowly reveals the portion of the display where the symbols appear. The sound occurs simultaneously with the appearance of the symbols. This provides the user with some satisfying audio feedback to indicate the appearance of the current row.

Another sound effect occurs substantially simultaneously with the appearance of border 52 and balloon 54, namely a brief audio fanfare. This combination of display and sound effects highlight the winning game play and gives the player a brief opportunity to celebrate.

Figure 8:
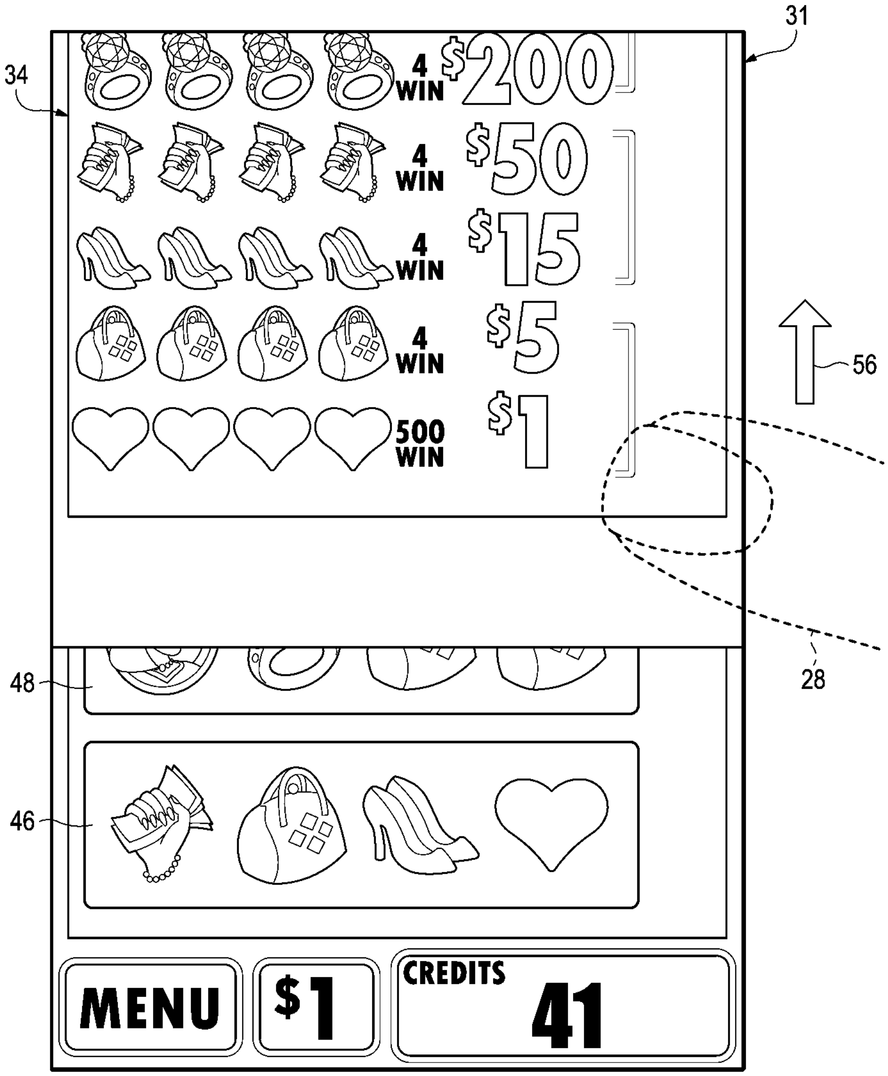
FIGS. 8-9 are views similar to FIG. 3 showing the player using the touch screen to view the results of the game played in FIGS. 4-6.
Figure 9:
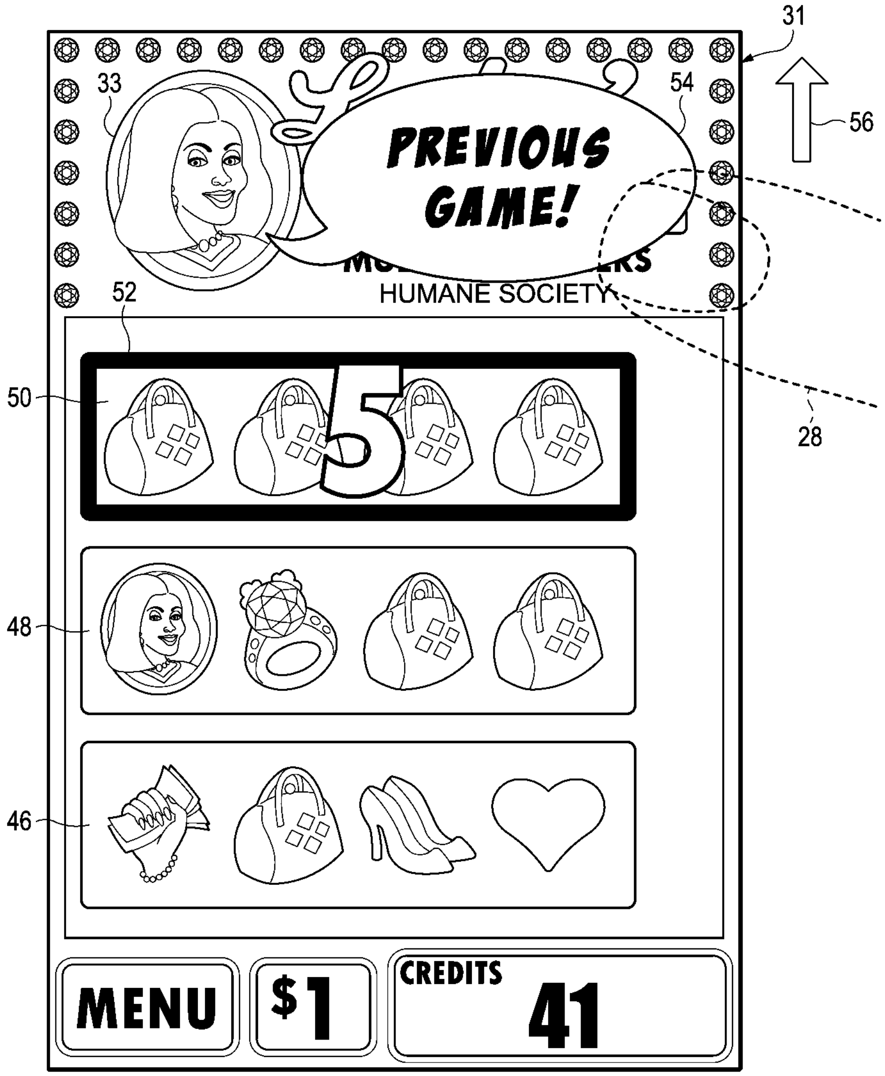

In still another game feature, the player may review the results of the previous game with an upward finger swipe in the direction of arrow 56 from the bottom of screen 31 as shown in FIGS. 8-9. Pay table 34 moves upwardly as shown, to reveal each of the rows that appeared in the game just played. In balloon 54, the words PREVIOUS GAME! appear. Thus, a player who is rapidly swiping down arrow 44 to present outcomes and move to the next game as quickly as possible can, with an upward swipe of the finger, review the outcomes presented in the last game after the pay table drops to present the player with an opportunity for further play.

Figure 10:
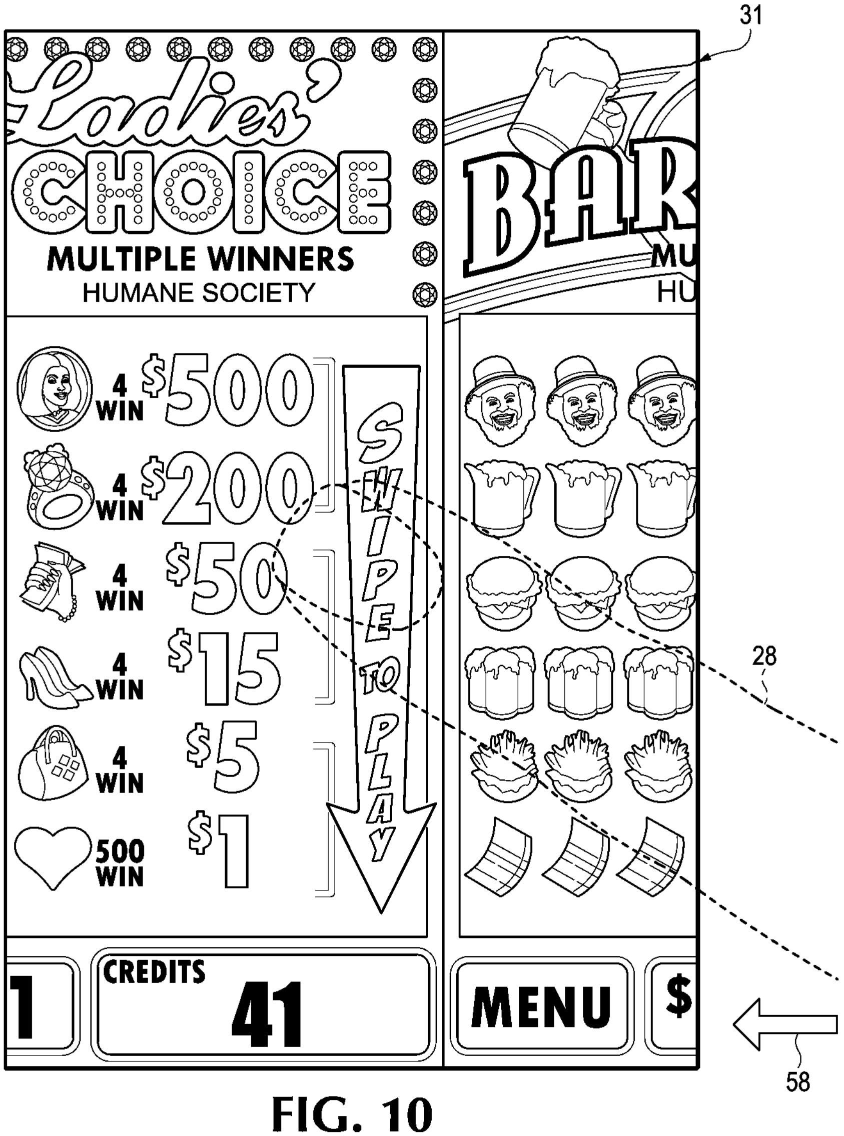
FIGS. 10-11 illustrate using a touch screen command to change from the game of FIGS. 3-9 to another game.
Figure 11:
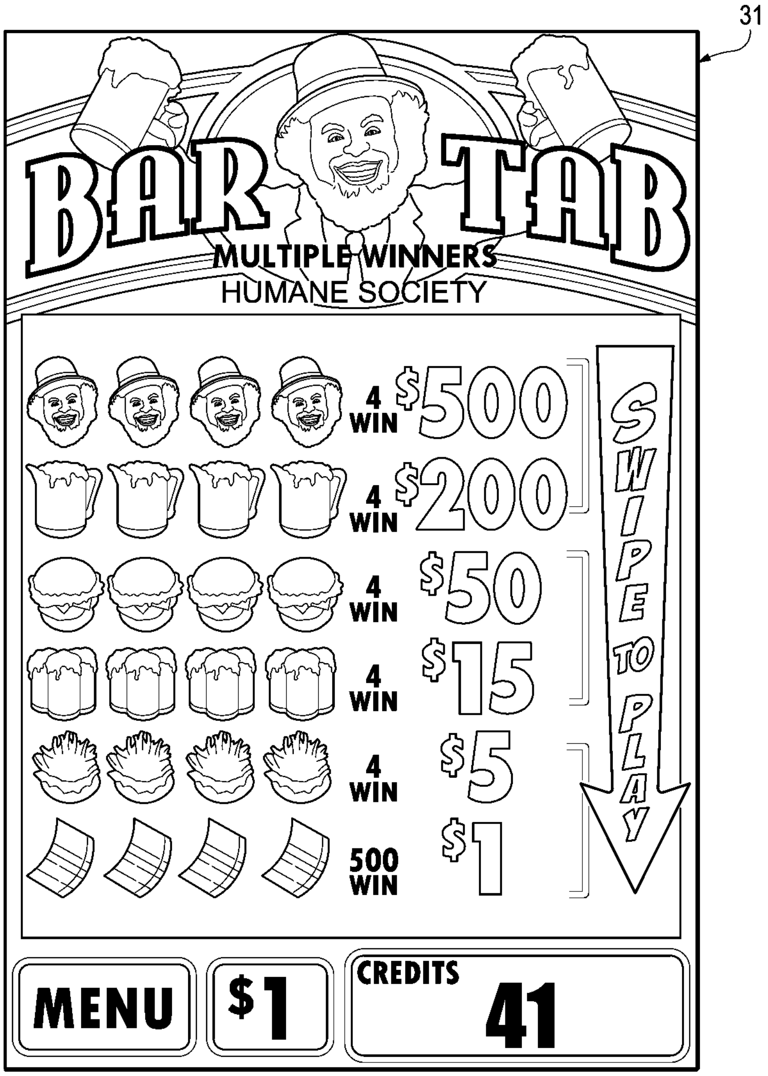

Finally, the player may select a different game theme with a lateral swipe of the finger, in the direction of an arrow 58 as shown in FIG. 10, to the game display on screen 31 in FIG. 11. As can be seen, the Ladies Choice game screen moves to the left as the finger swipes, and the new game Bar Tab moves in from the right, also as the finger swipes. This provides the illusion of a window in which many games, beyond the two depicted here, may be shifted laterally into position for play and also shifted laterally out of position as the next game in sequence shifts onto screen 31.

Here each of the games has the same pay table with the result of the move to the new game of FIG. 11 being simply a change in theme. It should be appreciated that the shift from one game to another might be to a game with a different pay table or even a different structure altogether, such as incorporating a bonus feature or a game of skill mixed with wagering.

Figure 12:
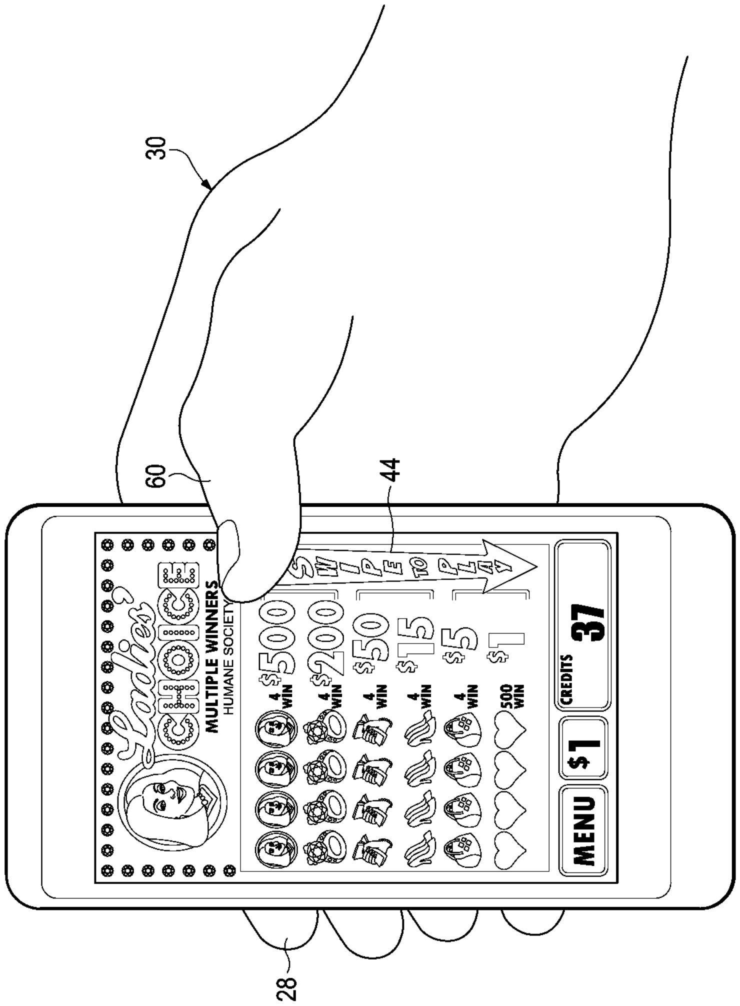
FIG. 12 is a plan view of a player using one hand to play the game of FIGS. 3-9.

Depicted in FIG. 12 is another way to play the Ladies Choice game or other games on device 24. Device 12 may be held in one hand, e.g., right hand 30. Rather than using forefinger 28 to swipe arrow 44 the player's thumb 60 is used. This facilitates one-handed playing of the device, which may be helpful in a crowded location where a player is standing and perhaps holding a glass in the other hand.

Figure 13:
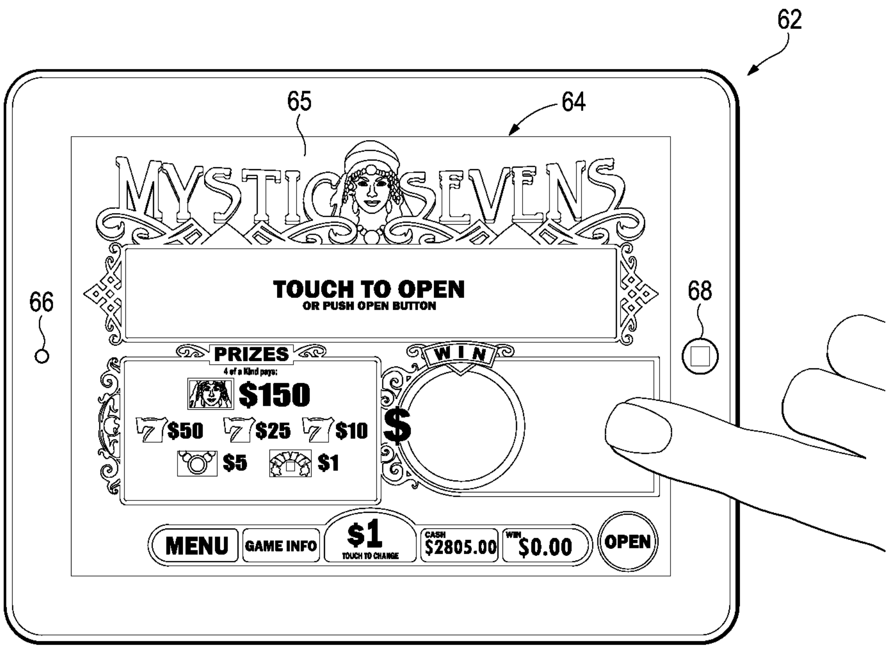
FIG. 13 is a plan view of a mobile computing device showing a screen display implemented according to the present embodiment.

Turning now to FIG. 13, indicated generally at 62 is another embodiment of the invention, which, like the previously described embodiment, is also implemented in a mobile computing device. Also like device 24, Apple Inc. manufactures device 62, which is sold under the iPad™ brand. Device 62, however, is larger in size than the approximately 4.4×2.3×0.3 inches of device 24. Device 62 is approximately 9.5×7.3×0.4 inches in size. Although implemented on mobile devices in the present embodiment, the present invention may also be implemented in devices in which only some or even none are mobile.

Device 62 includes a screen 64 upon which a game-display home screen 65 is shown, namely the Mystic Sevens game. Device 64 also includes a built-in camera having a lens 66 and a home button 68 for controlling various aspects of the device. Additional controls, not visible, control volume, screen rotation, power, etc.

Figure 14:
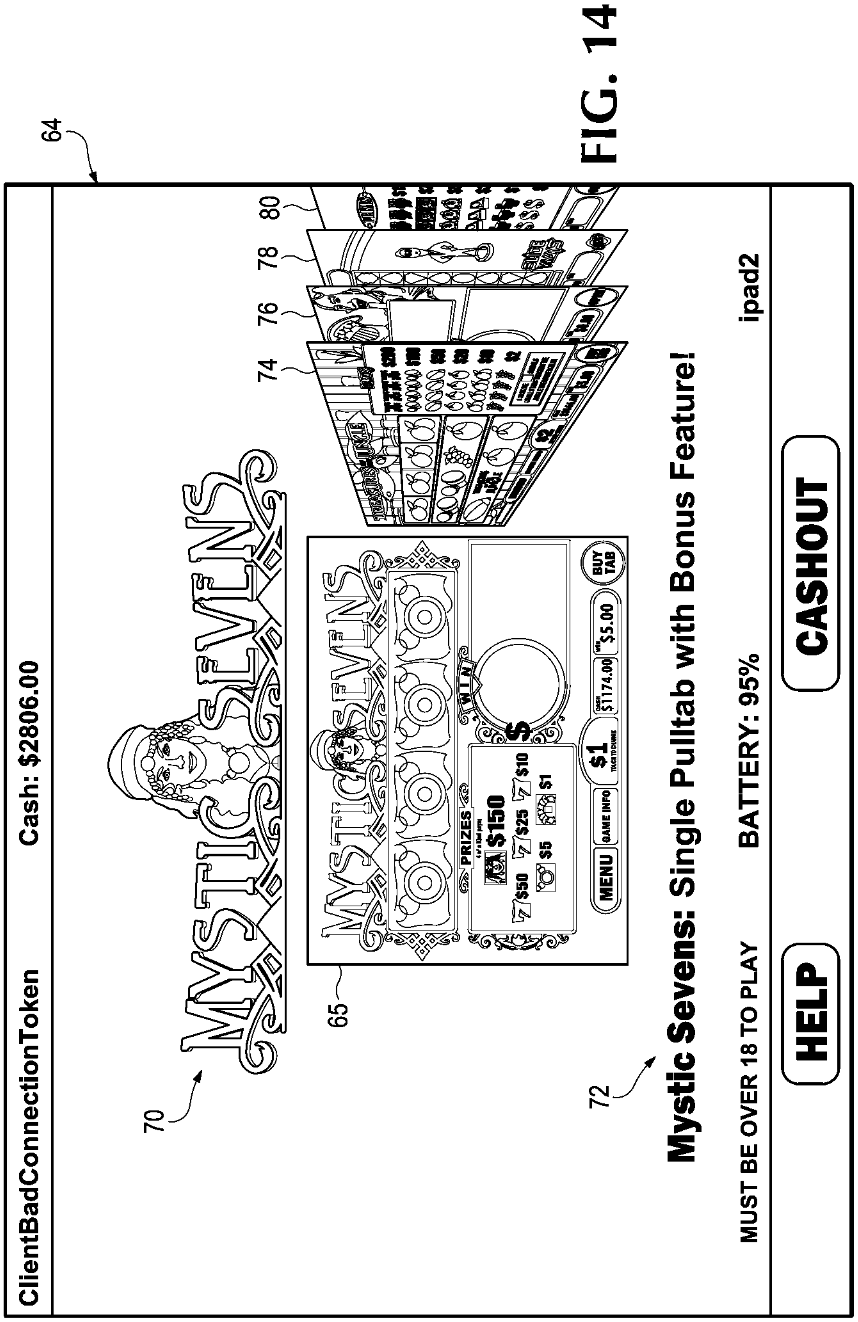
FIGS. 14-18 show sequential screen displays for selecting a game.
Figure 15:
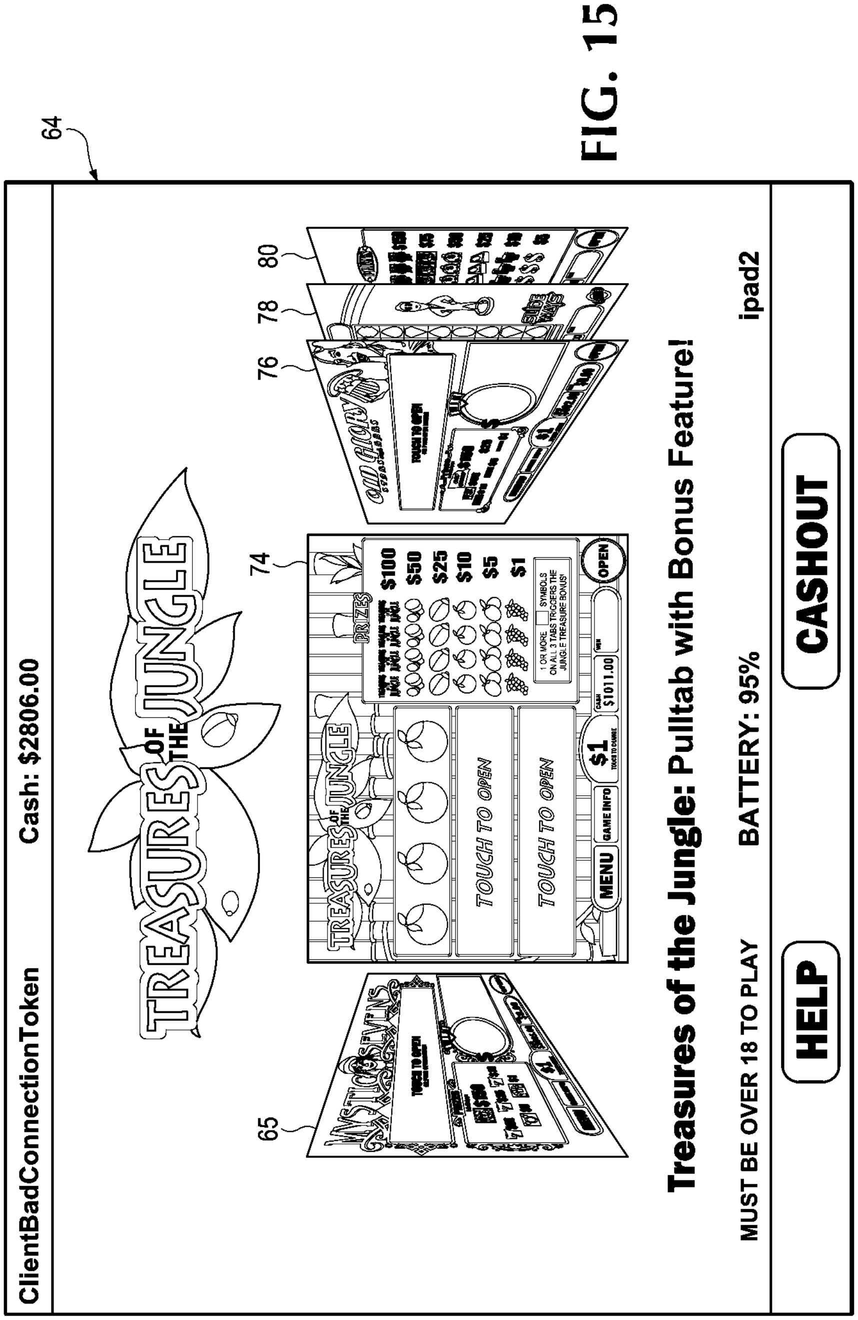
Figure 16:
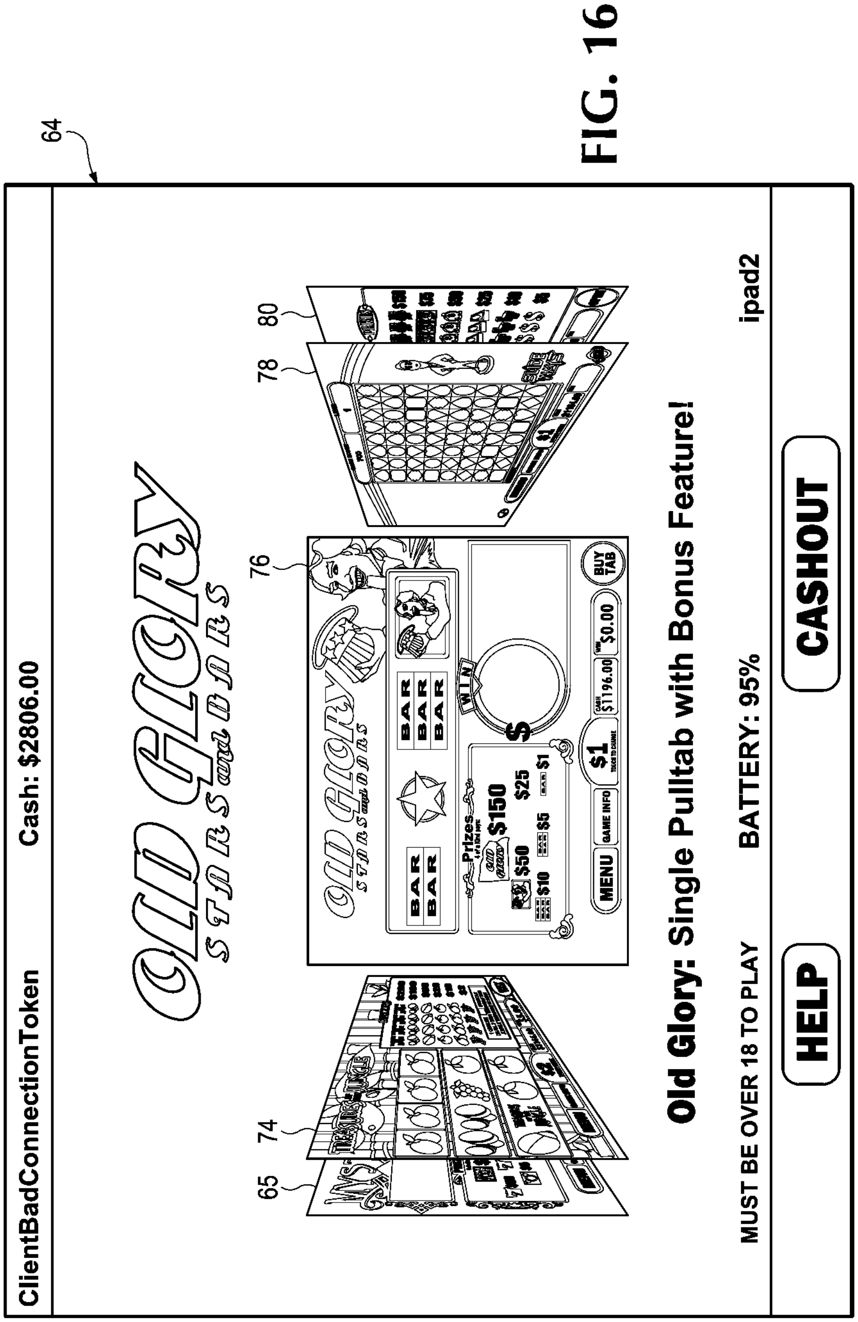
Figure 17:
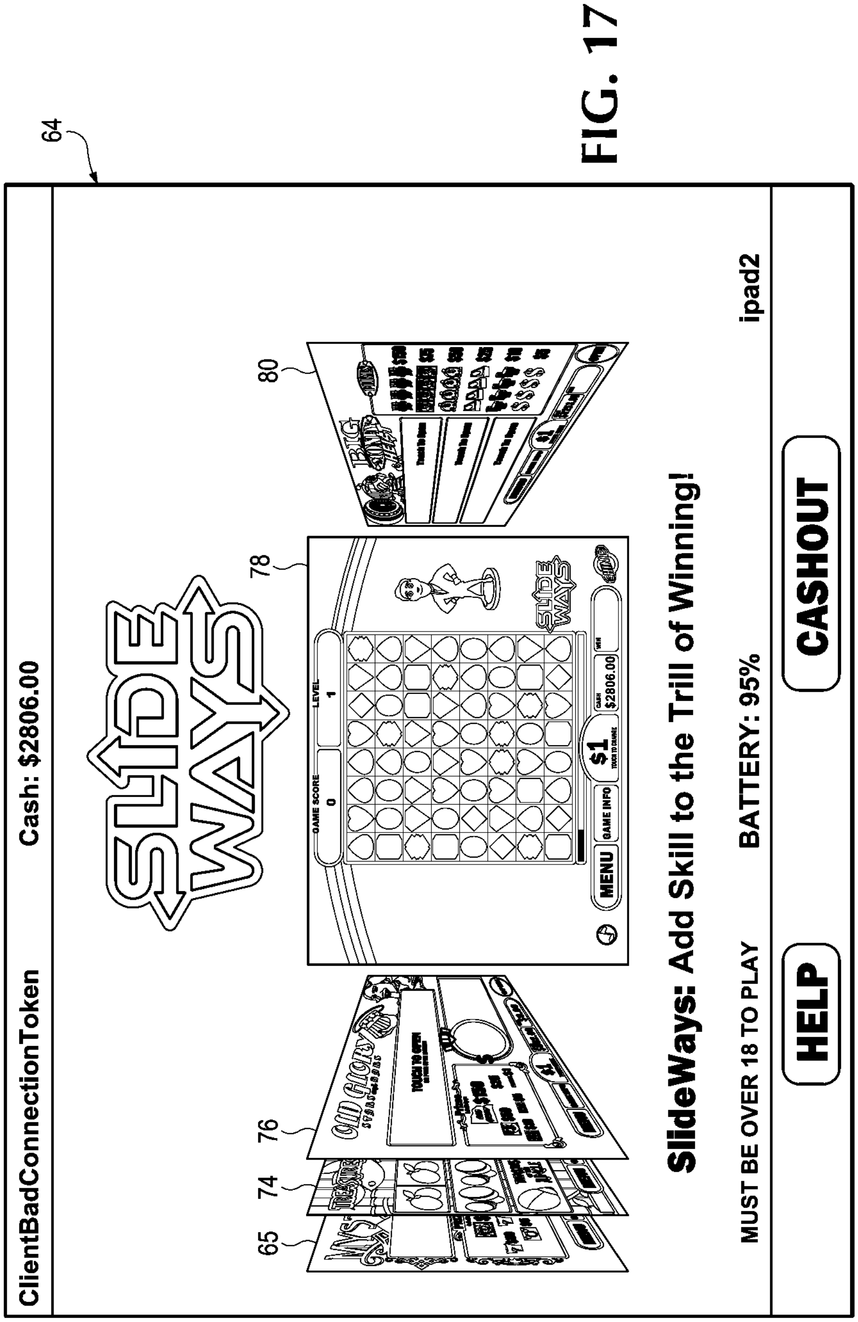
Figure 18:
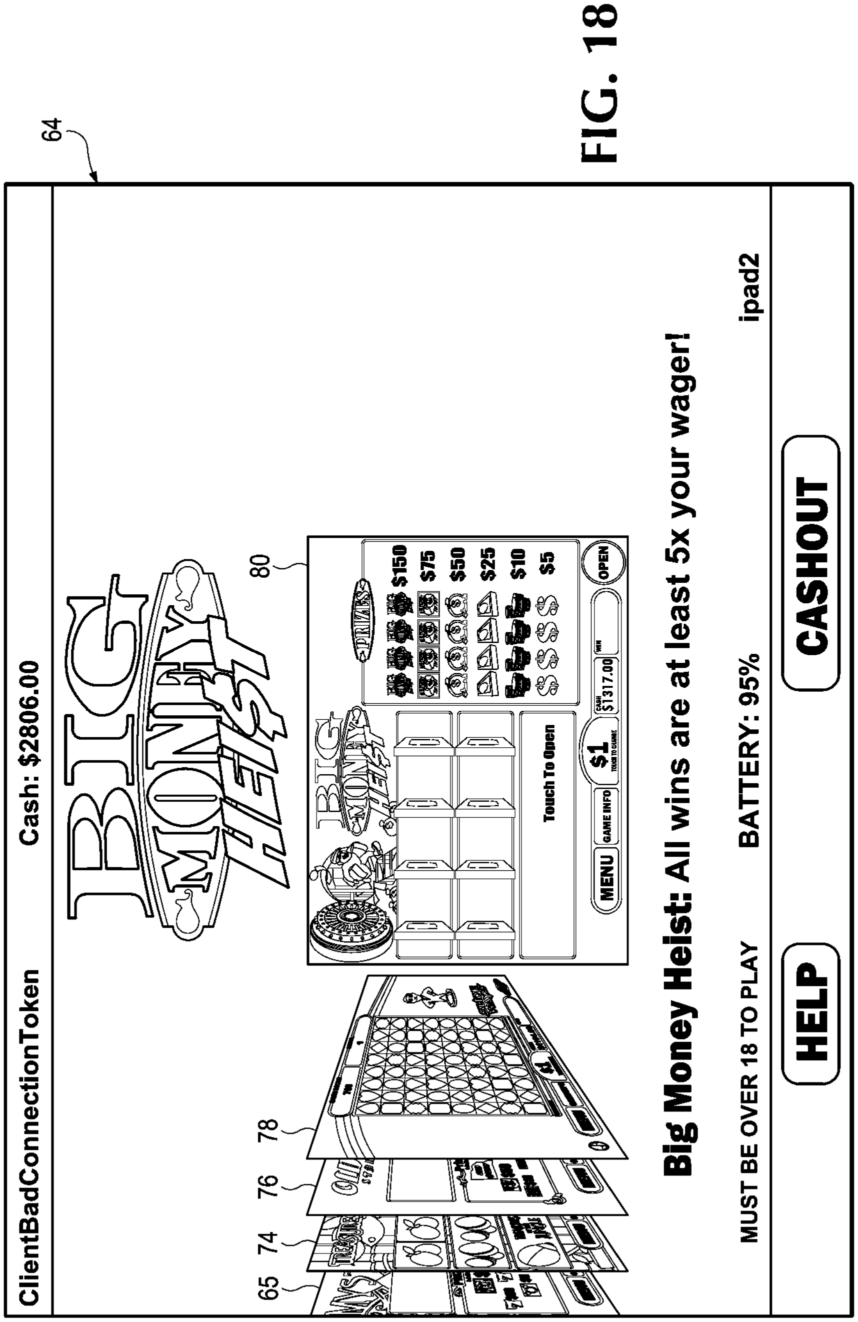

The displays in FIGS. 14-18 depict sequential views of a game selection operation, which permits the player to see a home screen for each of five games, and quickly select one of the games to play. As can be seen in FIG. 14, the home screen 65 for the Mystic Sevens™ game is front and center on screen 64. In addition to the home screen, a title 70 appears above screen 65 and a brief description of the game 72 appears below. Home screen displays are visible for each of four additional games, Treasures of the Jungle' 74, Old Glory: Stars and Bars™ 76, Slideways™ 78, and Big Money Heist™ 80.

As can be seen in FIGS. 14-18, it is possible to move each of the game home screens into a front and center position, as shown in FIGS. 14-18, by moving each home screen in sequence from the right side of screen 64, to the front and center position, and then to the left side of screen 64. This is accomplished using the Cover Flow® software component for browsing the contents of a library of video files provided by Apple Inc. with the operating system of device 62. As is known, home screen movement and display as described above is accomplished by lateral swipes of a user's finger across screen 64 in the direction of desired movement.

When a user wishes to play one of these games, the home screen display for that game is positioned front and center as shown for each game in FIGS. 14-18. When so positioned, the user touches the display with his or her finger and the game begins. For example, a user wishing to play Big Money Heist laterally swipes screen 64 until the Big Money Heist home screen is in the position of FIG. 18. When so positioned, the user touches home screen display 80 in FIG. 18, and the game software is loaded for play. When ready to play, home screen display 80 fills screen 64 similar to the view of FIG. 19.

Figure 19:
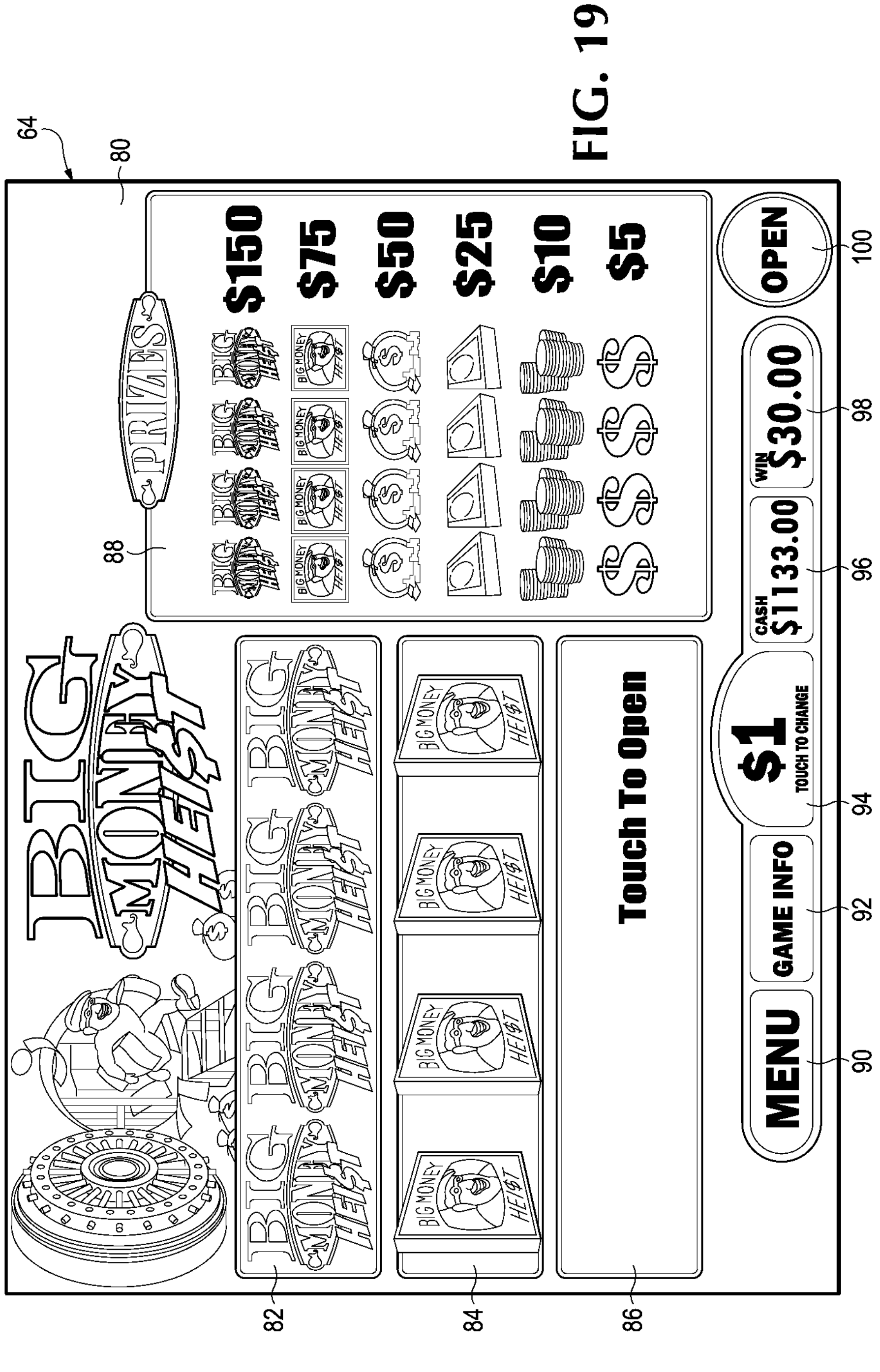
FIG. 19 is a screen display for the game Big Money Heist.

Big Money Heist is a multiple pull-tab game that incorporates pull-tabs 82, 84, 86. In FIG. 19, pull-tabs 82, 84 are opened, with the outcome of the symbol combination associated with pull-tab 86 still unknown. In addition to the pull-tabs, display 80 includes a pay table 88, which indicates combinations of winning symbols in pull-tab outcomes that produce game awards and the amount for each combination.

The lower portion of display 80 includes both touch-sensitive buttons and display panels. Starting at the left, a menu button 90 when pressed exits the Big Money Heist game and returns the screen to Cover Flow® mode as shown in each of FIGS. 14-18. This permits the user to laterally swipe thereby scrolling through the home screens to select a different game for play.

A game info button 92 when pressed presents information (not shown in the drawings) about the current game, in this case Big Money Heist. Such information may includes game rules, total number of outcomes in the current deck of outcomes (about which, more later), total outcomes remaining, and any other information about the game it might be desirable to communicate to the player.

A denomination button 94 serves both to indicate the amount of each wager and, in some games, to permit the player to change the amount wagered. In games with a changeable wager, each time button 94 is touched, it cycles through the possible denominations, e.g., $1, $5, $10, in sequence. This changes the amount that appears on button 94, and the amount that is wagered on each game. In other embodiments, the wager amount is fixed, and button 94 functions only as a display panel, i.e., it is not touch sensitive. In such embodiments, it serves merely to inform that player of the amount of the wager for all games played.

Credit meter 96 indicates to the player the amount of credit available for game play. This includes an initial amount applied to the game when the player first begins play using device 62. The way in which initial credits are applied is described in more detail after this initial description of game play. Credit meter 96 also includes credits that result from game awards. As a result, the credit meter decrements in the amount of the wager each time a game is played. And it increases by the amount of an award when a winning outcome is produced.

A win meter 98 indicates the total win for each game played. In other words, it indicates the amount that is applied to credit meter 96.

Finally, a touch-sensitive button 100 is used to play a game. At the outset, after Big Money Heist is loaded and before any games are played, the message on button 100 reads: "Buy Tab." Regardless of how tabs 82, 84, 86 appear when the game is first loaded, pressing button 100 decrements credit meter 96 by the amount of the denomination button 94. It also results in each of tabs 82, 84, 86, appearing as tab 86 in FIG. 19. In other words, the combination of symbols that comprises the outcome for each tab is not yet revealed, and each of the tabs bears the "Touch to Open" message. In addition, the message on button 100 changes from "Buy Tab" to "Open," as shown in FIG. 19.

Tabs 82, 84, 86 may be opened in at least two ways as a result of the touch sensitivity of screen 64. First, as instructed by the message on each tab, the player can touch the screen over the image of each tab, one at a time. Each time a tab is so touched, an image of the outcome associated with that tab appears. This image will be a combination of symbols that appear in pay table 88, although it is possible for additional symbols not shown in the pay table to appear. Those symbols, however, will always be part of a losing outcome for the tab in question.

Second, the tabs may be opened much more rapidly with a single vertical swipe of the player's finger. The finger may be placed on the screen on the top tab 82 or the bottom tab 86 and swiped vertically down or up, respectively, across both of the other two tabs. As the finger crosses the tab the outcome is revealed, thus providing for rapid game play.

In this variation, the swipe can start either above or below the top or bottom tab, respectively and swipe across that tab, through the middle tab, and onto the remaining tab. The swipe need not entirely cross the tab to open it; it need only come onto the screen above the image of the tab for the tab to open.

In addition, swiping can start on middle tab 84 and go either up or down across the other tab thereby opening only two tabs with a single swipe.

Once the results associated with each tab are displayed, i.e., tab 86 also includes four symbols, like tabs 82, 84 in FIG. 19, the outcome for the game is known. Any tabs that show one of the combinations on pay table 88 is a winner, and the amount in the pay table associated with that combination is added to credit meter 96. As the credit meter increments, a win fanfare and associated audio celebration accompanies the view of the incrementing credit meter.

Once all the tabs are revealed, and any credits resulting from a win are added to credit meter 96 as described above, the display on screen 64 can be a rotating view of symbols in each of the symbol position, which functions as an attract screen. Or it can simply display the outcome of the preceding game. Either way, button 100 now displays the "Buy Tab" message, and when pressed, a new game is initiated and played as described above.

Figure 20:
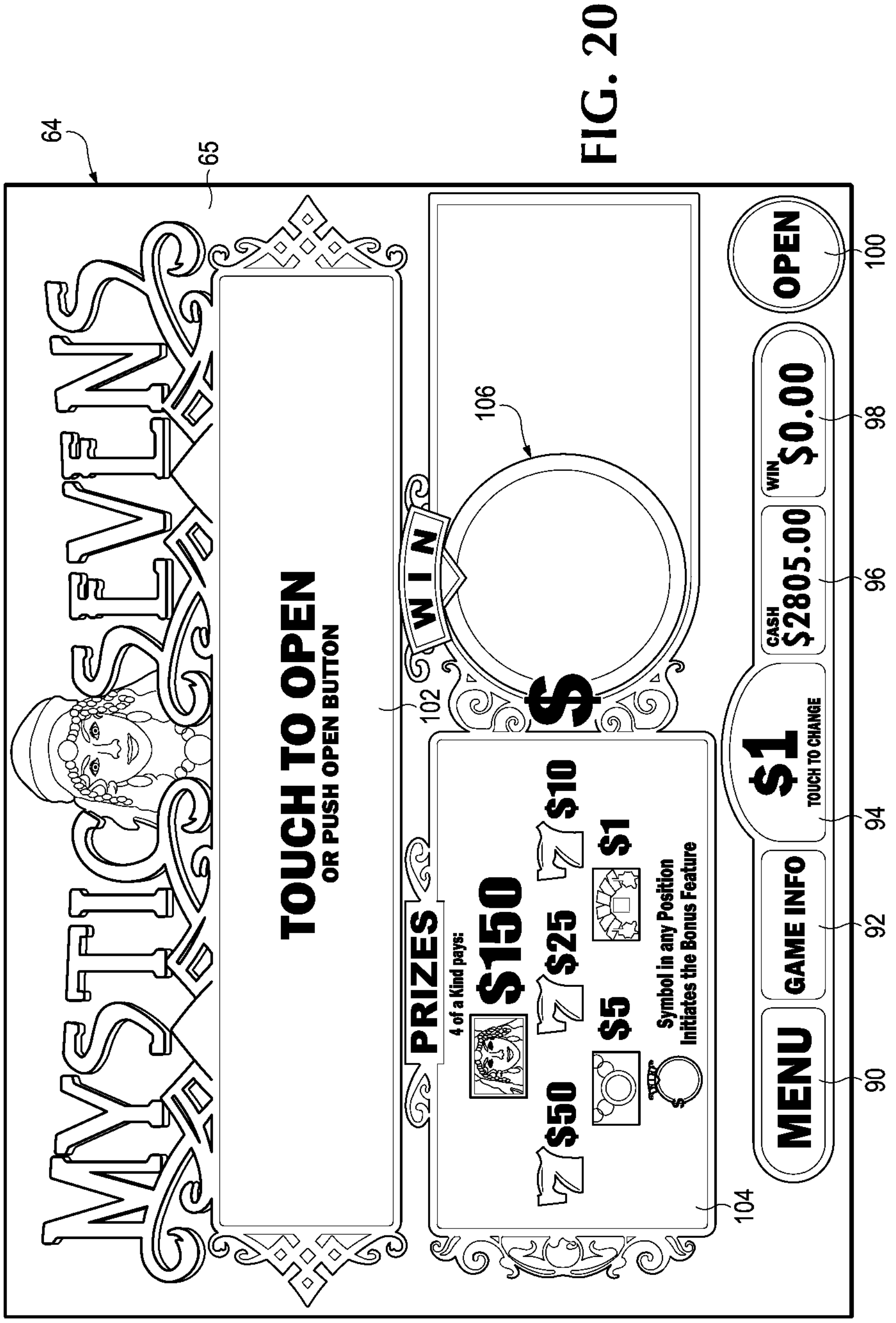
FIGS. 20-23 are screen displays for the game Mystic Sevens.

When the player wishes to play a different game, e.g., Mystic Sevens, he or she pushes menu button 90, and the screen returns to the Cover Flow® mode as shown in each of FIGS. 14-18. This permits the user to laterally swipe thereby scrolling through the home screens until Mystic Sevens is front and center as shown in FIG. 14. When screen 64 is touched over the home screen image of Mystic Sevens, that game is loaded. With reference to FIG. 20, the touch-sensitive buttons and meters that correspond generally to those described and explained in FIG. 19 bear the same numeral in FIG. 20. When Mystic Sevens is first loaded it appears generally as shown in FIG. 20, except that button 100 says "Buy Tab" rather than "Open," and a combination of four symbols from those shown in pay table 104 appear. This may be a predefined combination, the results from the previous play of Mystic Sevens, or an attract screen that may or may not incorporate symbols.

Figure 21:
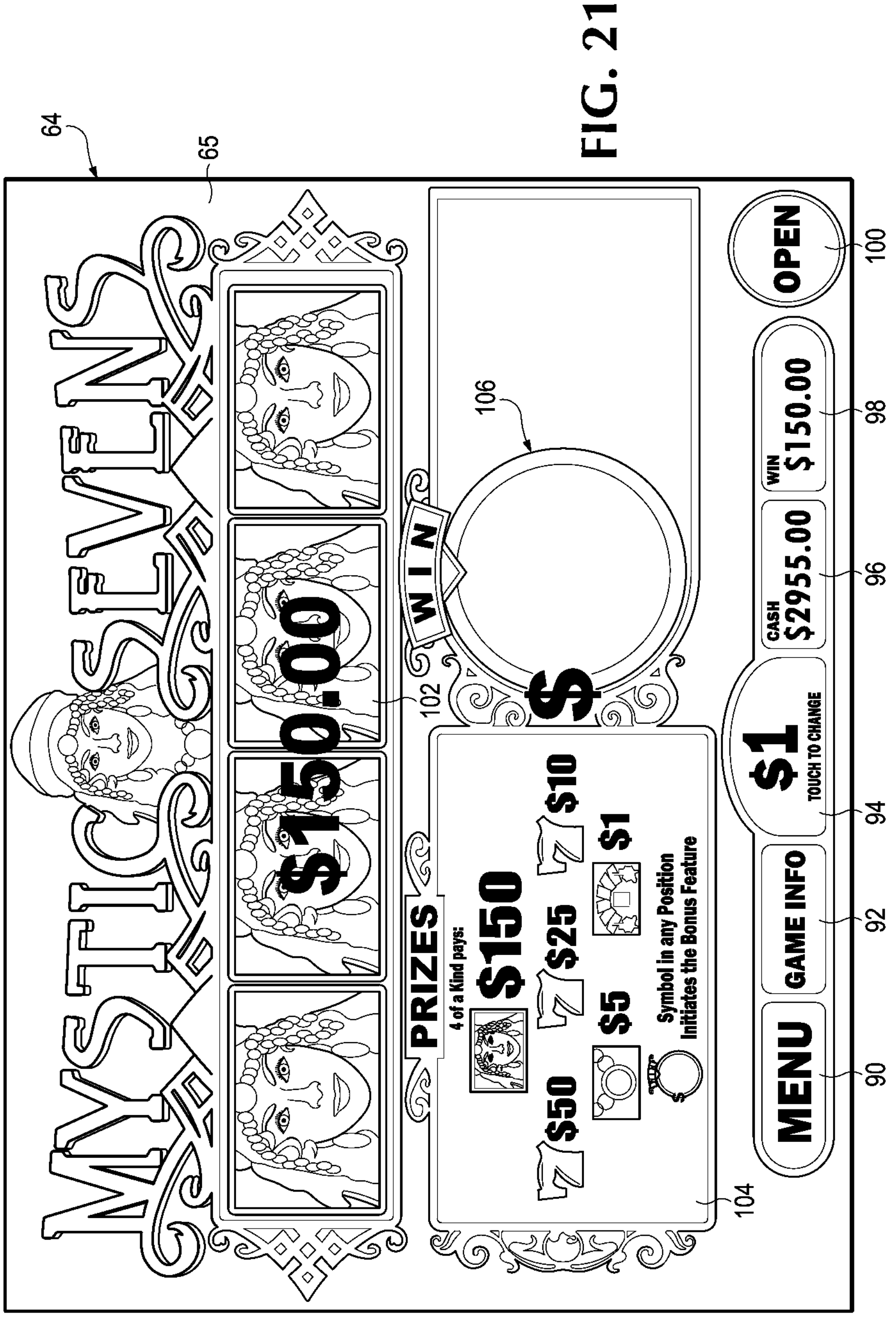
Figure 22:
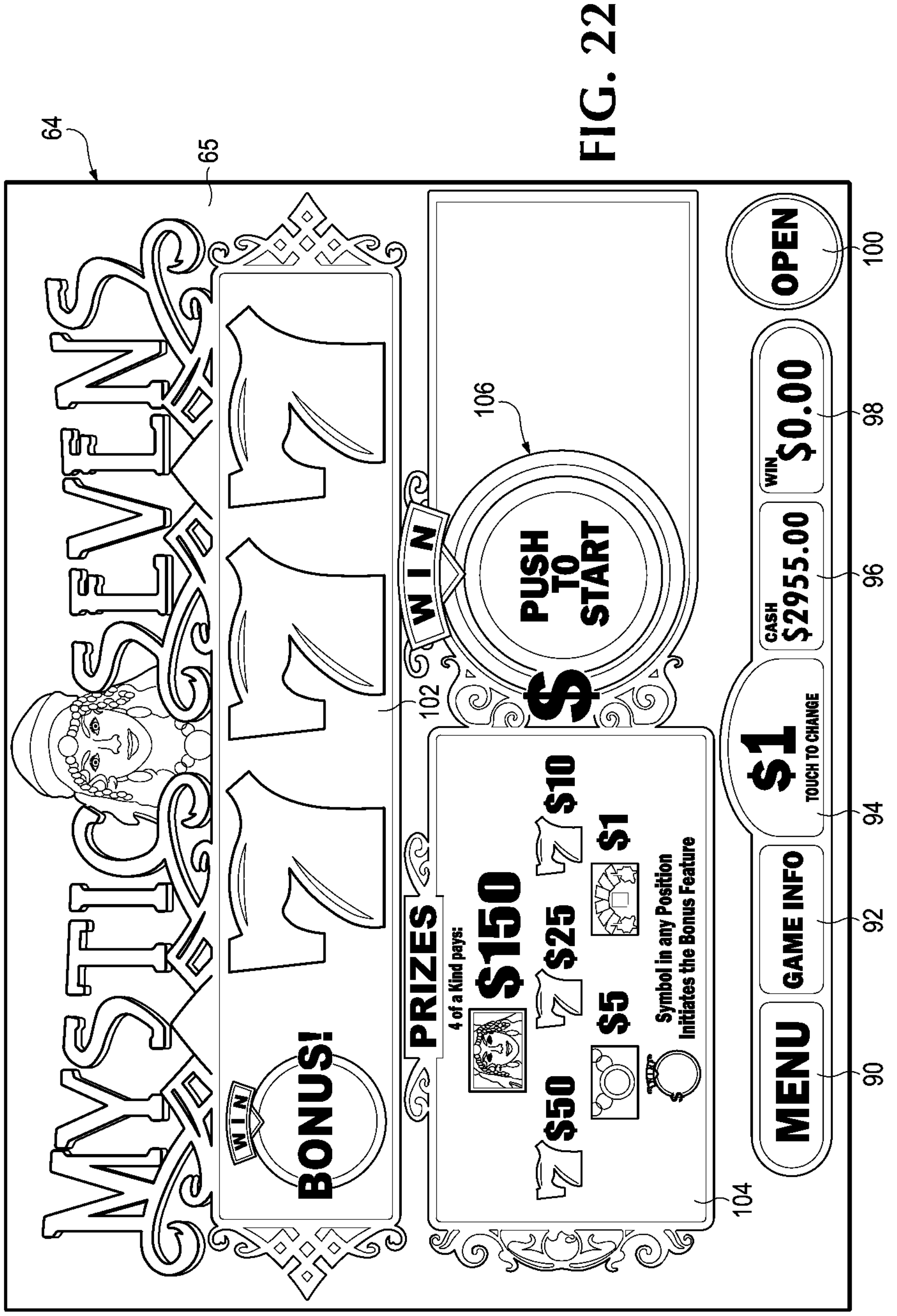
Figure 23:
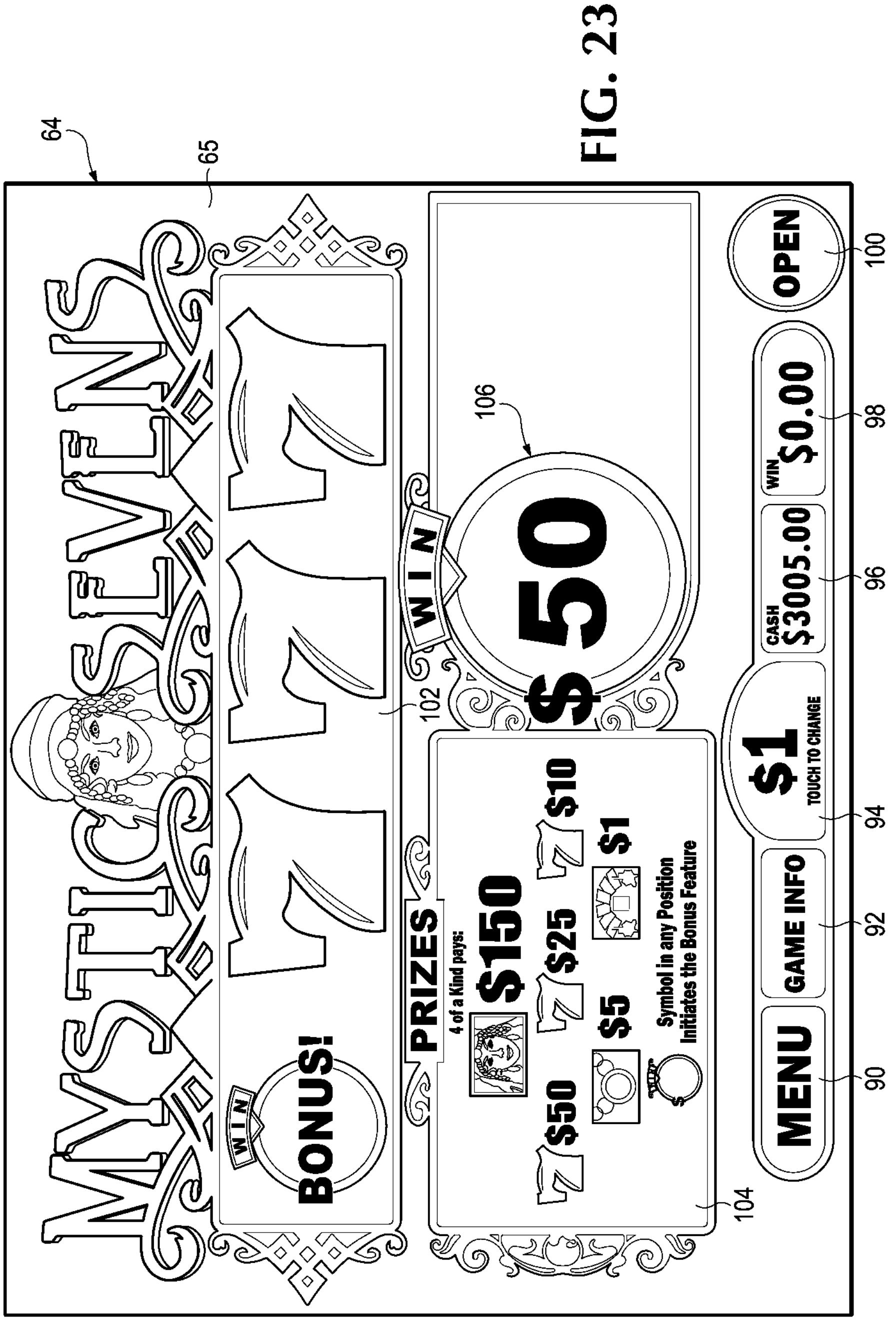
Figure 24:
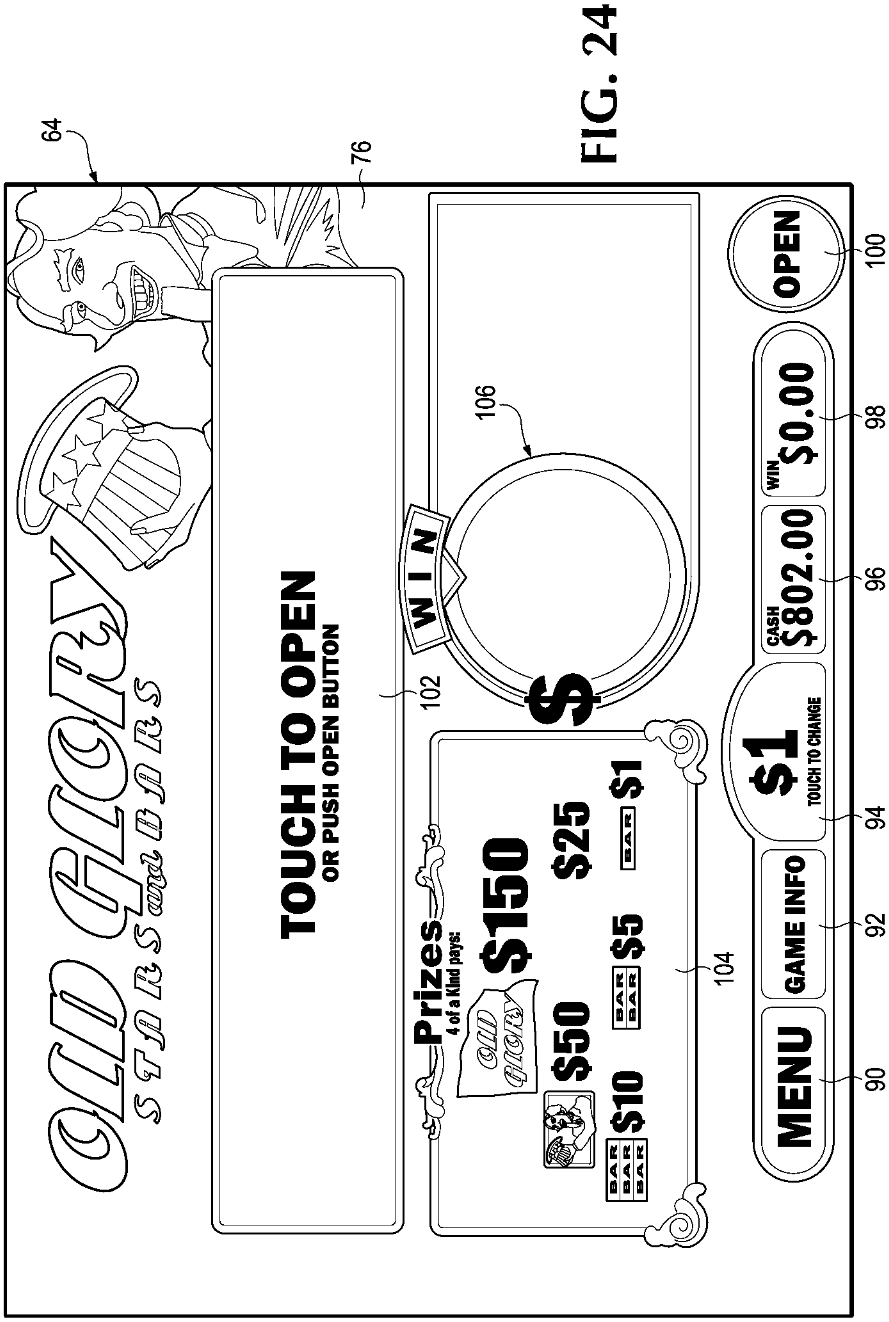
FIGS. 24-27 are screen displays for the game Old Glory: Stars and Bars.
Figure 25:
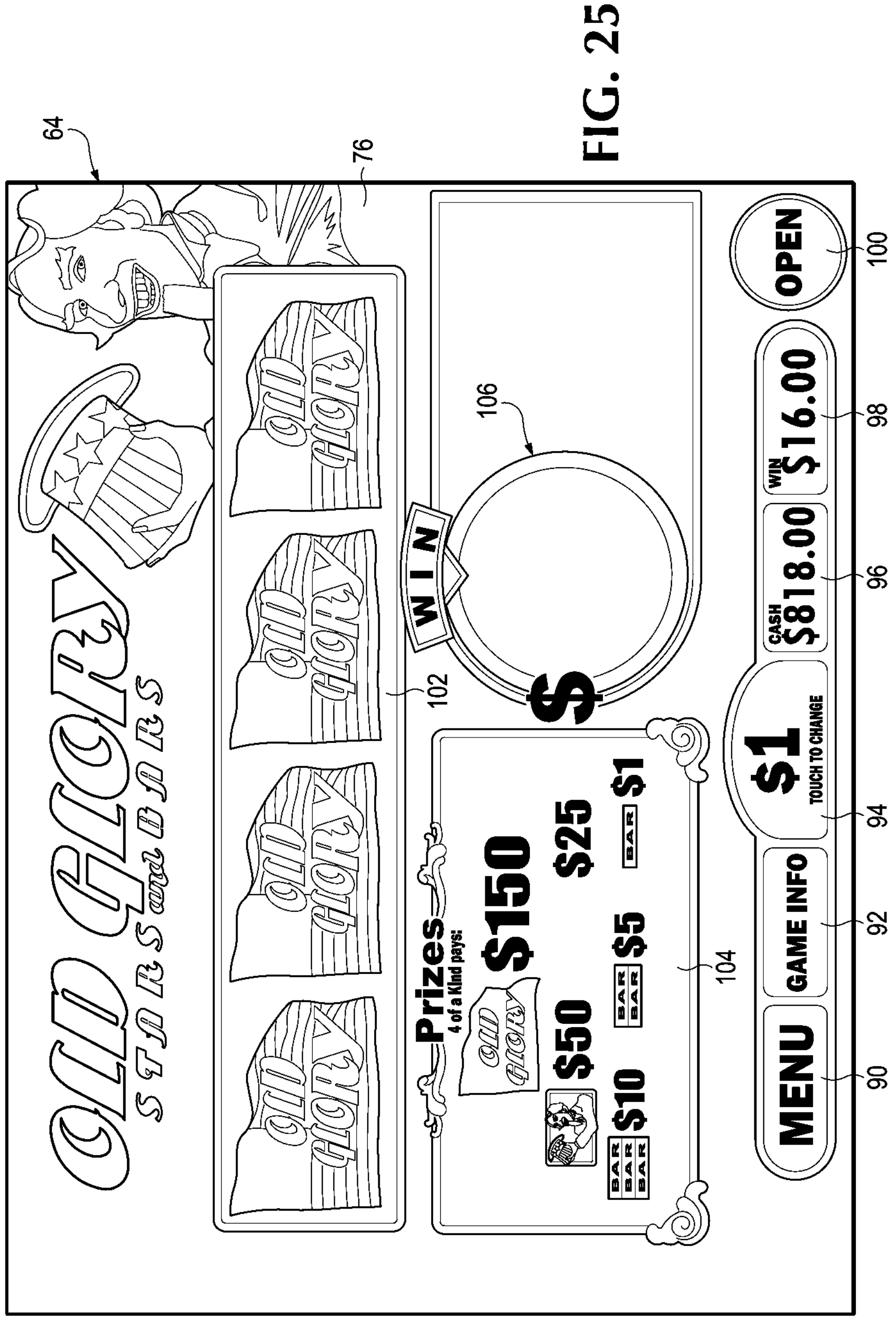
Figure 26:
Figure 27:

Mystic Sevens is a single pull-tab game that includes a pull-tab 102, the outcome of which is obscured (i.e., the pull-tab is closed) in FIG. 20, but shown (i.e., the pull-tab is open) in FIGS. 21-23. In addition to pull-tab 102, display 65 includes a pay table 104, which indicates combinations of winning symbols in pull-tab outcomes that produce game awards and the amount for each combination.

It also includes a bonus feature 106, which is triggered from time to time during game play. Game play is initiated by pushing button 100 when it displays the "Buy Tab" message (not shown).

Doing so, as in Big Money Heist, decrements credit meter 96 by $1, the amount of the wager displayed on button 94. In addition, the screen image at pull-tab 102 is as shown in FIG. 20 with the words "Touch to Open or Push Open Button." At this stage, the player may either push button 100 or touch the screen image at pull-tab 102. Doing either one reveals the symbol combination purchased by the current wager, which is shown in FIG. 21. In FIG. 21, the symbol combination matches the top award of $150, which is applied to the credit meter.

FIG. 22 depicts the game after a number of further plays, the most recent of which triggered bonus feature 106 as a result of a symbol 108 appearing as one of the revealed symbols on pull-tab 102. When the bonus is triggered, a message "Push to Start" appears on bonus feature 106. Touching the screen over this message initiates a bonus sequence in which a plurality of different dollar amounts are displayed in sequence as shown for the $50 depicted on the bonus feature in FIG. 23. The sequence is accompanied by an audio sound with the appearance of each number. It begins rapidly and then gradually slows to a final number, thus creating suspense about which number will remain. After the last and therefore winning number appears, the word "Win" appears above the number as shown in FIG. 23, and a brief fanfare accompanied by some visual brightening of the display provides a brief moment of celebration for the win.

Alternatively, the bonus can be provided as a multiplier of the wagered amount. Whichever way the bonus is presented, after the win presentation, the "Buy Tab" message again appears on button 100, and the game is ready for further play as described above.

As a further alternative, the bonus feature may start automatically after conclusion of the game in which the bonus symbol appears as one of the revealed symbols.

FIGS. 24-27 display screens during play of Old Glory: Stars and Bars. It can be selected for play in the same manner as described above for selecting another game to play. The Old Glory game is essentially the same game as Mystic Sevens but with a different theme. As a result, the screen images depicted in FIGS. 24-27 correspond generally to the screen images shown in FIGS. 20-23, respectively. Corresponding numerals are used to identify corresponding portions of the depicted screen images. Play of Old Glory is substantially the same as play of Mystic Sevens.

Figure 28:
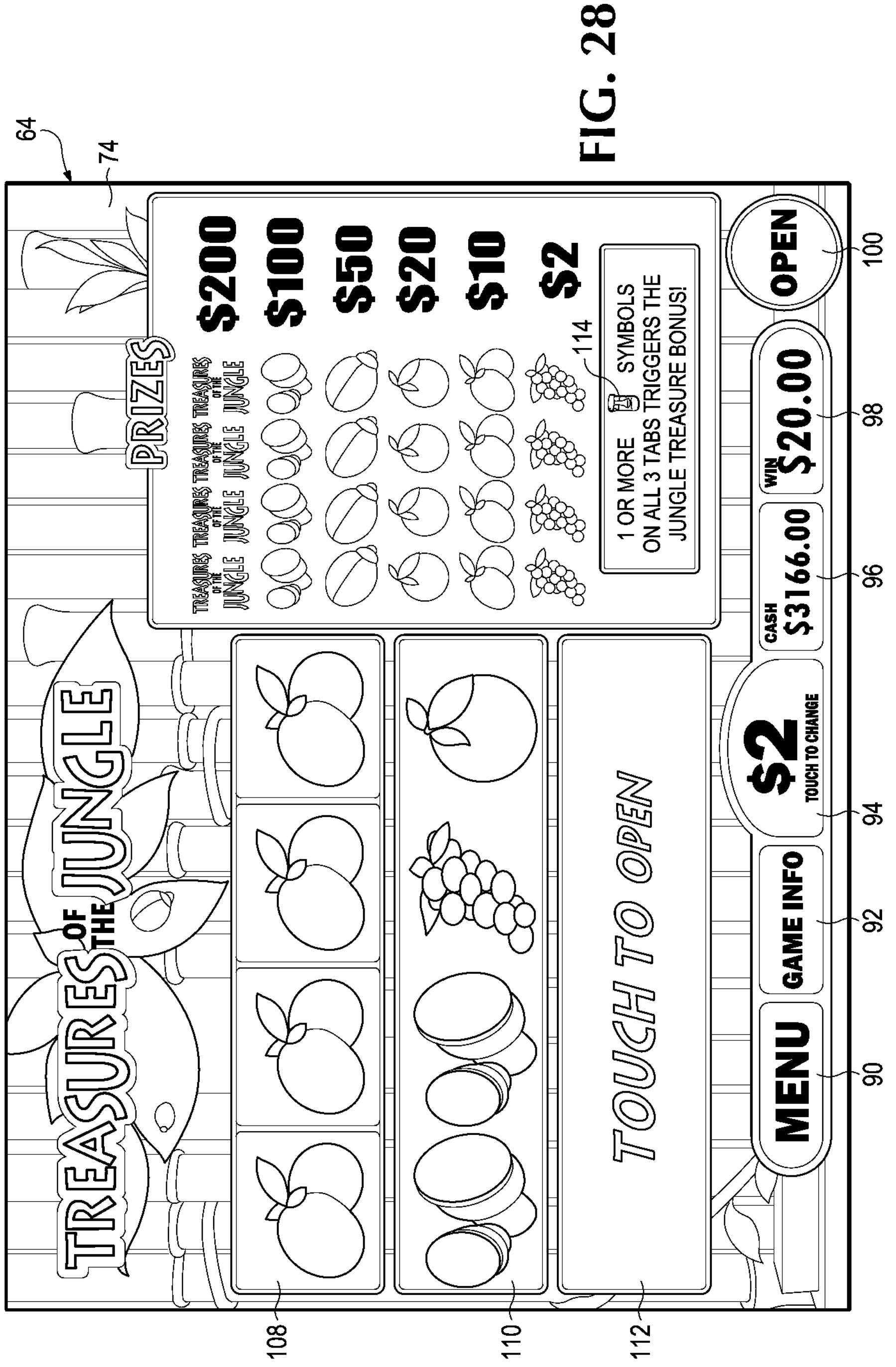
FIGS. 28-30 are screen displays for the game Treasures of the Jungle.
Figure 29:
Figure 30:
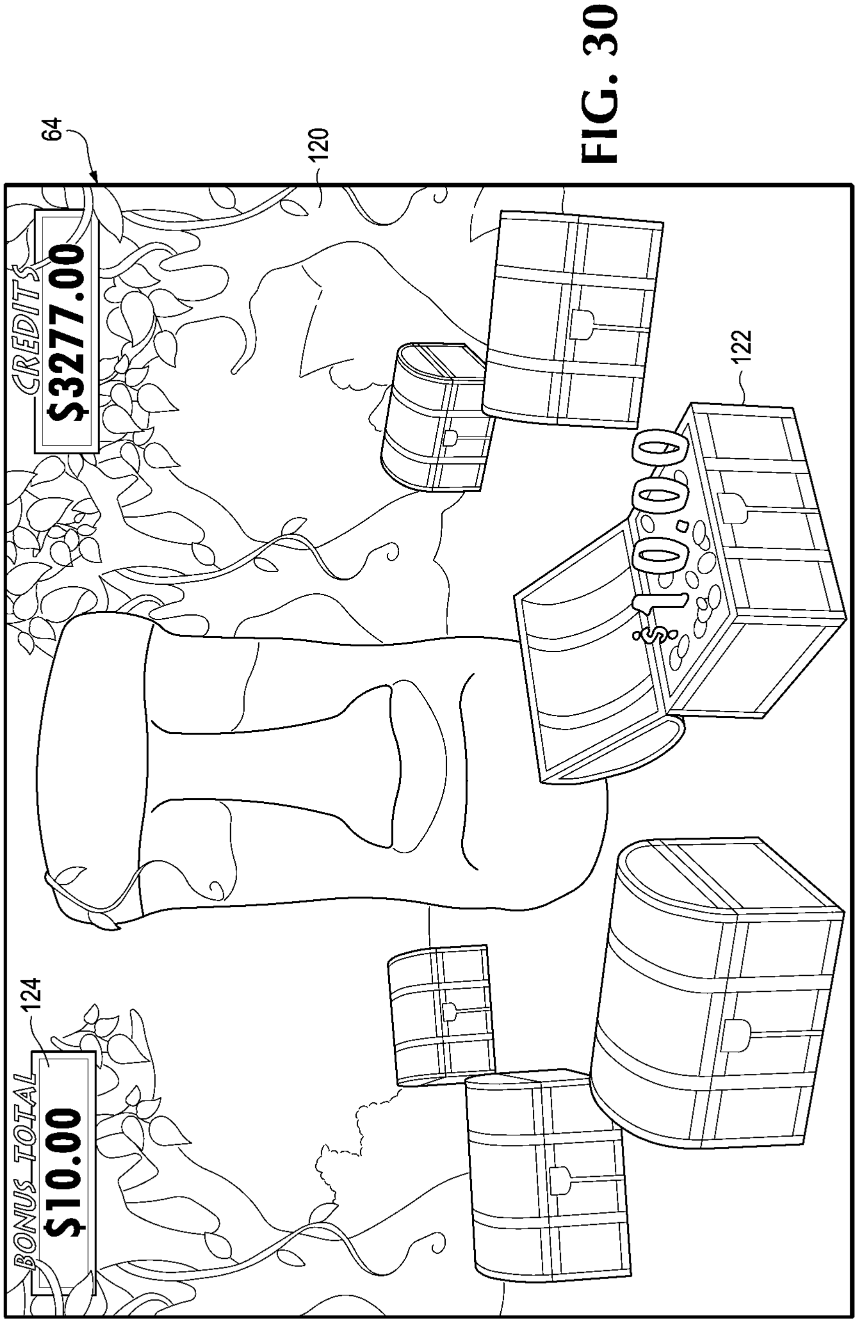

Turning now to FIGS. 28-30, screen images from the game Treasures of the Jungle are shown. This is a multiple pull-tab game with a bonus feature. It is selected using the Cover Flow® mode as described above. Once selected, an initial screen 74 similar to that shown in FIG. 28 appears. The symbols that appear on each of pull-tabs are predefined or, as with the other games, may comprise the symbols produced in the last play of the last game, or may be an attract screen. In any event, button 100 as with the other games, first appears with the "Buy Tab" instruction. After that button is depressed, thereby initiating a multiple tab game, pull-tabs 108, 110, 112 each appear like pull-tab 112, i.e., with a "Touch to Open" instruction prior to revelation of the symbol combinations that comprise the outcome for each pull-tab.

Then the player can touch each tab or swipe to open as described above in connection with playing Big Money Heist. In the screen image of FIG. 28, tabs 108, 110 are each opened thus revealing the symbol combinations for each pull-tab, with pull-tab 108 being a $20 winner.

After further continued play, not shown, the bonus feature is triggered when one or more tiki-head symbols 114 appear on each of pull-tabs 108, 110, 112 (also not shown). Immediately thereafter, a bonus-screen image 116 appears as shown in FIG. 29. Once the player pushes a touch-sensitive button 118 marked "Push to Start," a bonus screen image 120 in FIG. 30 appears.

As soon as screen image 120 appears the words "Choose a Treasure Chest" are superimposed over the image thus prompting the player to touch one of the treasure chests, like treasure chest 122, in FIG. 30. Doing so results in a quick animation of the lid opening to reveal gold and other treasure within along with a dollar amount that appears over the treasure chest, indicating the amount awarded in response to touching that treasure chest.

The dollar amount also appears in a bonus meter 124 in the upper left corner of FIG. 30. After chest 122 opens, the prize is indicated over the chest as shown, and the total added to bonus meter 124, treasure chest 122 closes, and the "Choose a Treasure Chest" instruction is again superimposed over the image again prompting the player to touch a treasure chest. This could be the same chest previously chosen or a different one. After doing so the bonus amount again appears over the chest and is added to bonus meter 124.

In some bonus rounds, there might be the opportunity to choose only one treasure chest, after which the game reverts to regular play as described in connection with FIG. 28. The number of chests presented to the player and the cumulative amount of the bonus may vary for each bonus round, depending on the game design, which will be discussed further hereinafter.

Figure 31:
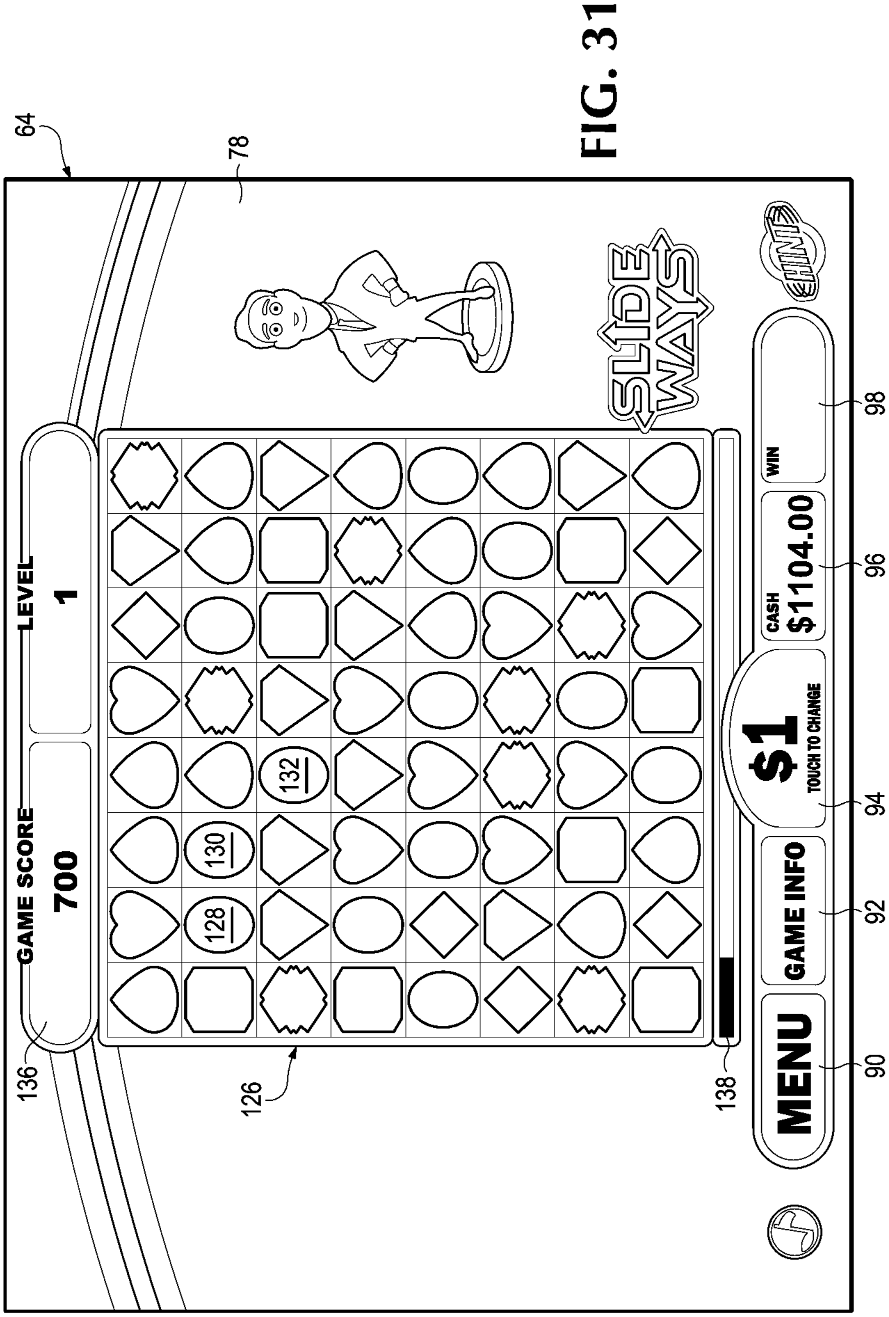
FIGS. 31-33 are screen displays for the game Slideways.
Figure 32:
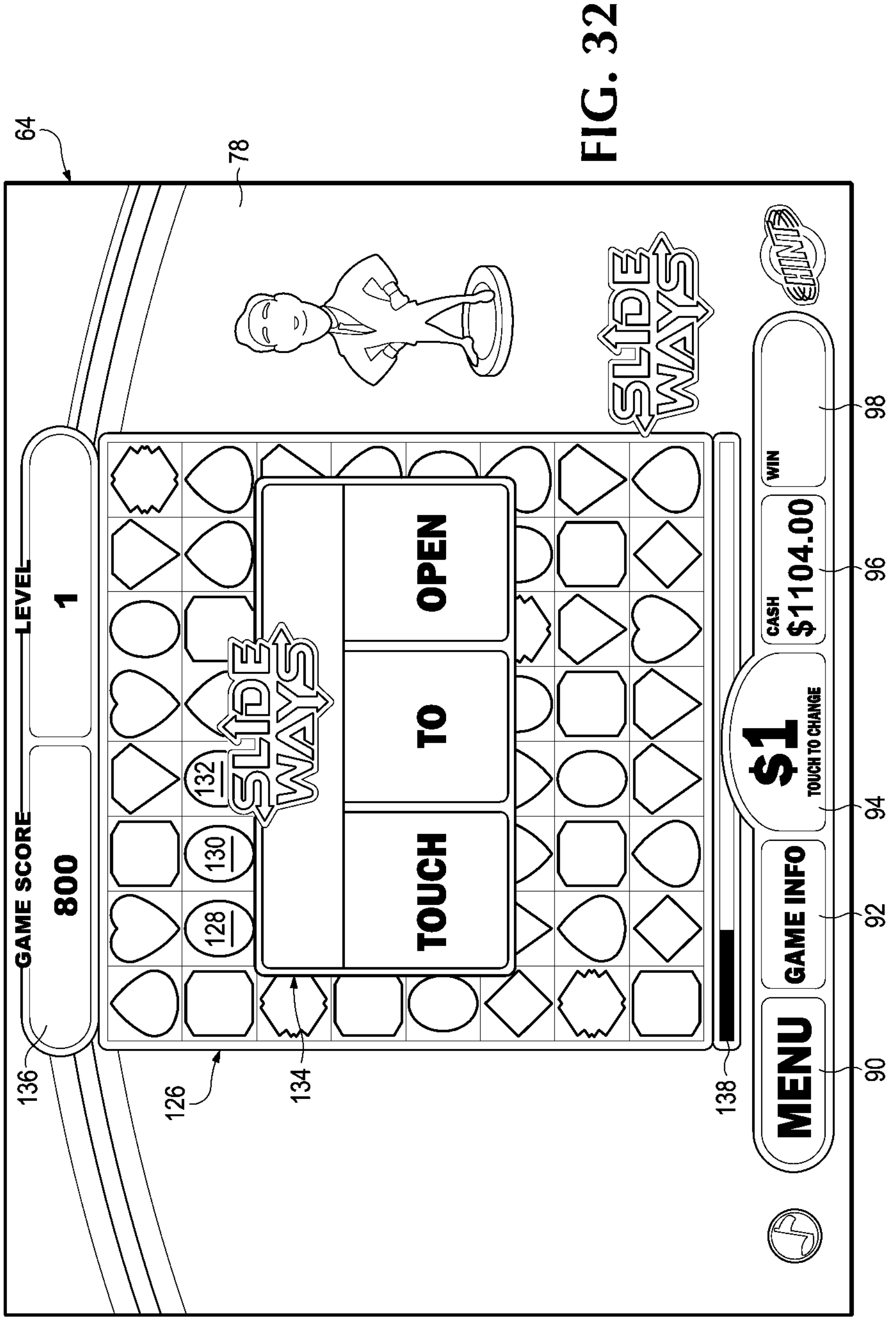
Figure 33:
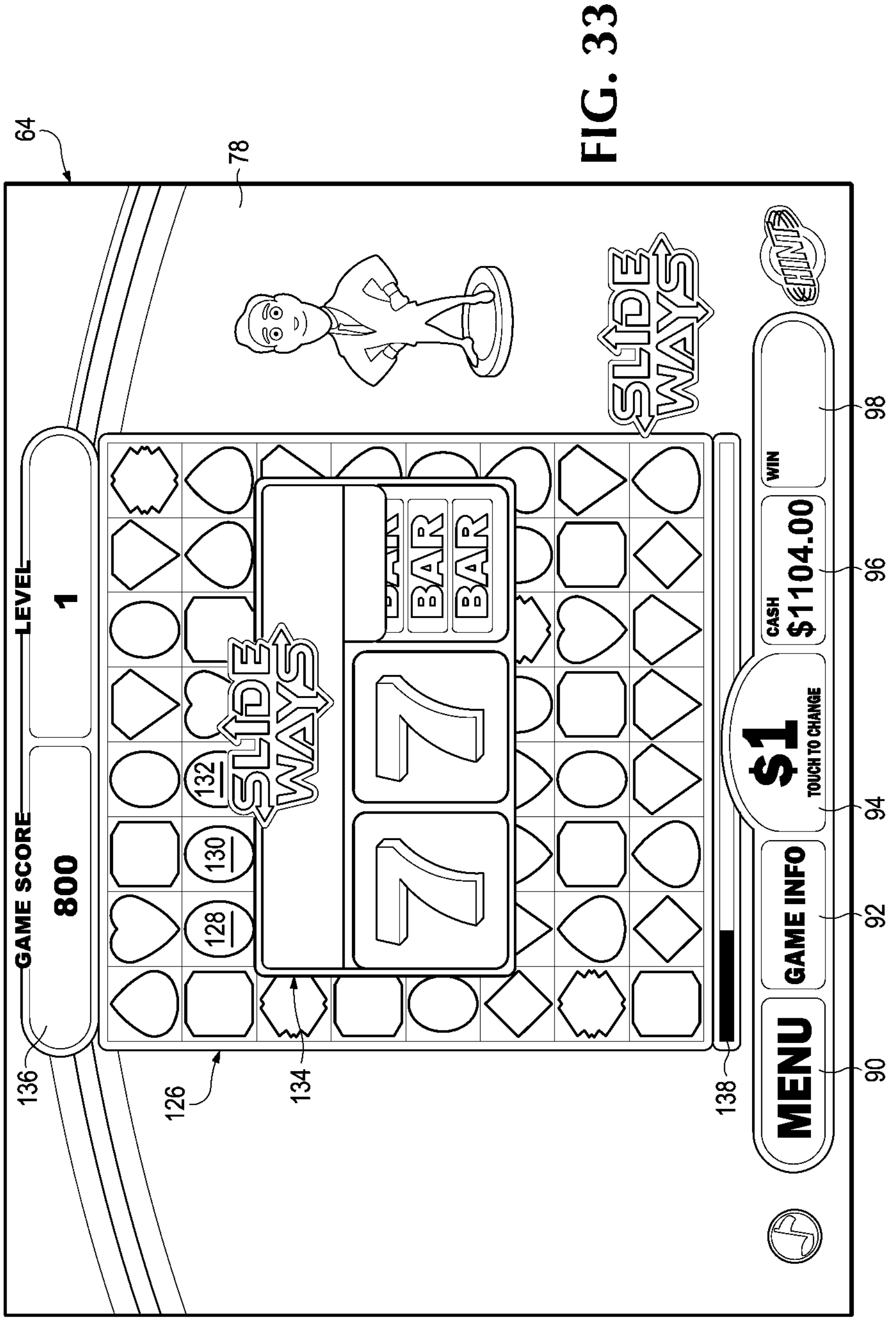

Turning now to FIGS. 31-33, somewhat schematic screen images from the game Slideways are shown. This is an entertainment game, which may have an element of skill, combined with a single pull-tab wagering game, which—in the present embodiment—produces only random outcomes. The Slideways game is selected using the Cover Flow® mode as described above. Once selected, an initial screen 78, in FIG. 31, appears. Previously numbered buttons and meters retain the same identifying numeral and a similar function in FIG. 31.

The Slideways game includes a grid of differently cut and colored jewels on a game-board image 126. Image 126 is touch sensitive and produces an impression of movement of one jewel in the grid to an adjacent spot in the grid in one of four directions: up, down, left, or right. Such movement is accomplished when a player touches the selected jewel and drags it to its new location. When so moved, the jewel stays at its new location, and the jewel previously there automatically moves to the location of the moved jewel. In short, the jewels trade places.

The object here is to align three or more identical jewels in a single straight row. For example, opals 128, 130, 132 are not aligned as shown in FIG. 31. Touching opal 132 and moving it straight up to the adjacent location on board 126 results in three jewels in a row, as shown in FIG. 33. When a player makes this move, a pull-tab panel 134, in FIG. 33, appears over a central portion of board 126. It bears the words "Touch to Open." When the player does so, a three-symbol combination is revealed, which pays, or not, according to the game's pay table. Any awards increment credit meter 98.

Screen image 78 includes a game-score meter 136, which increments each time jewels are aligned as described above. In addition, a horizontal bar graph 138 increments proportional to the score displayed in the game-score meter. As game play continues, each time an alignment of three or more jewels is made, score meter 136 increments, as does bar graph 138, and the player is presented with a three-symbol pull-tab, which he or she touches to open thereby revealing the symbols as shown in FIG. 33.

A touch-sensitive hint button 140 may be used to receive a hint of where a jewel may be moved to create an alignment of three or more jewels. In response to depressing button 140, red brackets (not shown) appear around a jewel that could be so moved.

After the symbols are revealed, the credit meter reflects an award, if any, and the aligned jewels disappear. The jewels immediately above the empty positions drop to fill those spaces, and new jewels appear to fill the resulting empty spaces in the top line of jewels, when the player-created alignment was horizontal, or in the top several lines, when the player-created alignment was horizontal.

In addition, when the newly appearing jewels create additional alignments of three or more jewels, score meter increments accordingly, although in the present embodiment, additional opportunities to reveal the pull-tab are not presented until the player makes a further alignment by touching and dragging a jewel, as described above.

The Slideways game may incorporate the features of U.S. application Ser. No. 12/718,792 filed on Mar. 5, 2010, for Entertainment Game-Based Gaming Device which is hereby incorporated herein by reference for all purposes.

Before turning attention to the details of operating pull-tab games according to the present invention, consideration will first be given to the structure containing the system used to control, operate, and account for the games. This structure is implemented primarily in two locations, the first at a venue where the games are played and the second at a central location that provides data needed to play the games; that accounts for credits applied to the games, wagers made, and awards granted; and that maintains logs for virtually all transactions on the games. Of course, this structure could be implemented at a single location.

Figure 34:
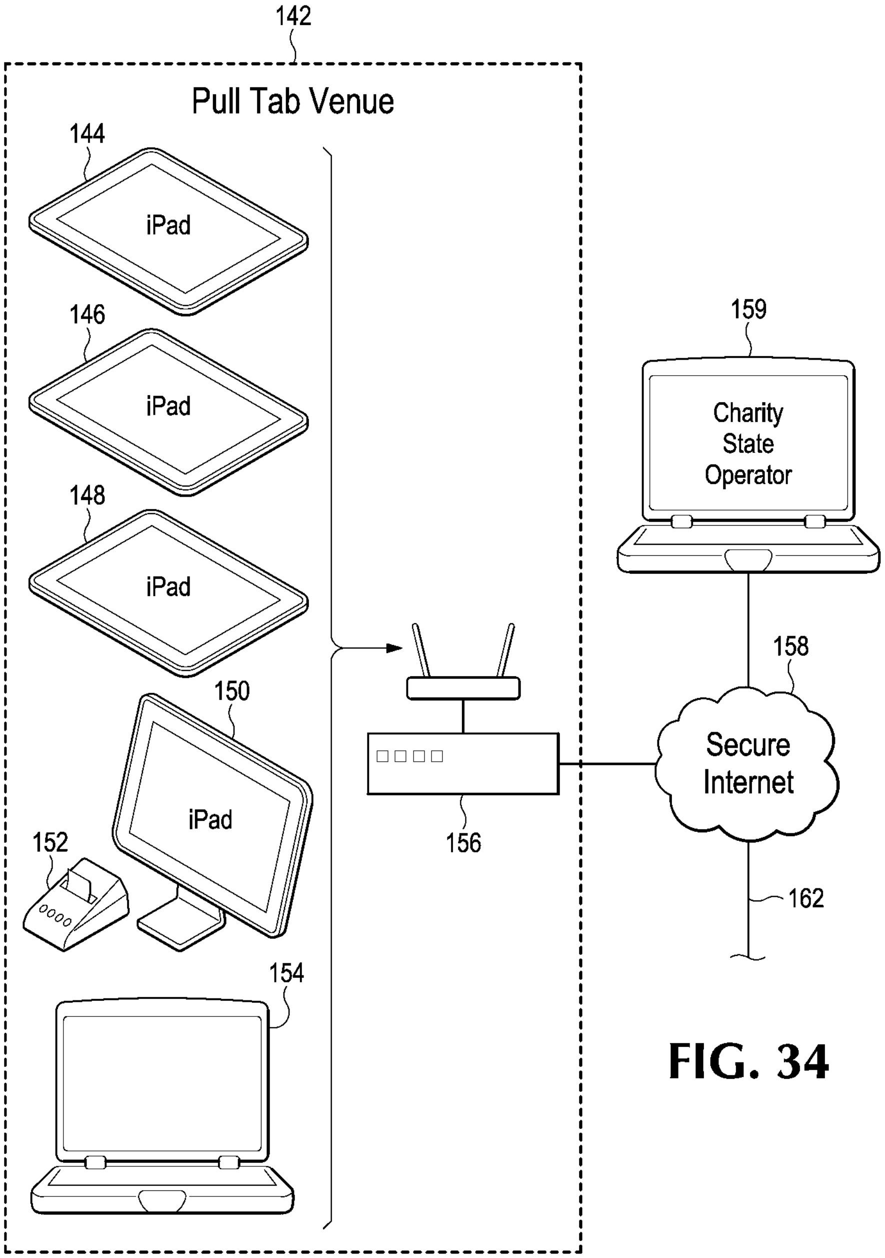
FIGS. 34 and 35 are schematic diagrams depicting portions of the present embodiment.

In FIG. 34, a schematic diagram, indicated generally at 142, depicts a venue at which player terminals 144, 146, 148 may be used to play games, like those described above. FIG. 34 is illustrative of one venue; the present invention may incorporate many hundreds, or even thousands of such venues. And although the present embodiment is implemented at venues that contain relatively few player terminals, e.g., 6-12, it is equally well suited for venues, such as casinos, that contain thousands of gaming devices or terminals.

In the present embodiment, the terminals are substantially identical to device 62 described above. A person affiliated with venue 142 or with a charity that benefits from the gaming conducted there operates a cashier terminal 150. Of course, any person, regardless of affiliation, could operate the cashier terminal. A ticket printer 152, which communicates in a known manner with cashier terminal 150, may be used in some embodiments to purchase credits and redeem credits and awards as will be shortly described. A computer 154 can access data generated by the system to review status and/or to print reports based on data collected by the system. Finally, terminals 146-150 and computer 154 each communicate via the Wi-Fi standard with a wireless router 156, which in turn communicates with the Internet via a secure connection in the present case SSL.

Another computer 159 also communicates with the Internet to obtain reports and logs. Computer 159 may be used by regulators, a charity that benefits from the gaming at venue 142, by a manager or operator of the system, or different computers so connected may be used by all or any of them.

Figure 35:
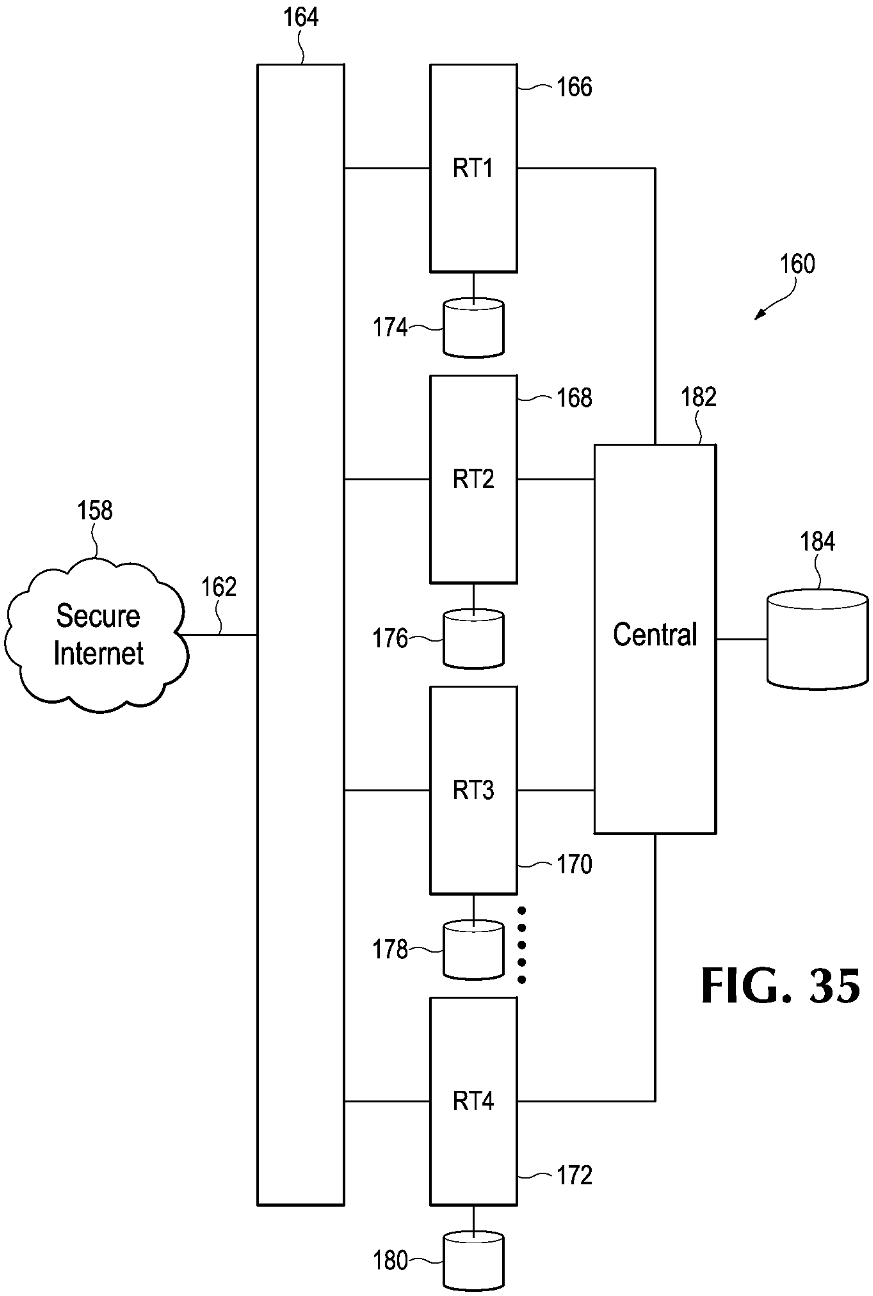

A central system, indicated generally at 160 in FIG. 35, is connected to venue 142 by a secure Internet connection 162. Central system 160 may be anywhere but an ideal place is a colocation center, which provides equipment space, high-speed Internet connections, power, cooling, and physical security for the central system. Regardless of its location, the central system includes a firewall server 164. Among other things the firewall server receives Internet communications from gaming venues, like venue 142, and appropriately routes those communications when received.

The firewall server is connected to each of a plurality of real-time servers 166, 168, 170, 172. As can be seen by the dots between servers 170, 172, there may be any number of such servers, which reflects the load on central system 160. Put differently the more venues, like venue 142, are associated with system 160, the more real-time servers are required. It is possible, but not necessary, for each venue to be associated with a different one of the real-time servers, i.e., there is one-to-one correspondence of each venue with an associated real-time server. In addition to collecting data from each venue, there is a real-time server dedicated to each of the following tasks:

- receiving initial traffic (in some embodiments) from all of the venues and routing it to the real-time server associated with the venue from which the data in TCP/IP data packets was received (referred to as Usher thus suggesting the function served);
- manufacturing of decks from which game outcomes are selected in response to a wager placed at a venue with which the deck is associated, consolidation of data from selected venues, as stored on different ones of the real-time servers, and web interface;
- processing client download requests;
- a logger for logging all transactions; and
- utility operation.

As a result of the possibilities associated with distributed computing using virtual servers, these tasks may be divided in many ways among virtual or real servers and may be provided from different locations.

Each real-time server is associated with a SQL database 174, 176, 178, 180. Finally, each of the real-time servers communicates with a central server 182 that collects accounting data and other information that can be used to generate reports. All of the servers can be implemented in a virtual environment using commercially available software. This provides a scalable and extensible platform that is backed up on a separate physical machine that can accommodate the software components in the event of a hardware failure. Central system 160 also includes a storage area network (not shown) in which data can be stored and from which it is accessed.

Before describing a typical gaming session and the functions performed by a game operator at a gaming venue such as a bar or restaurant, consideration will first be given to how a venue, such as venue 142, is initially configured and installed and the manner in which information flows between the venue and central system 160.

After a venue agrees to install the components shown in FIG. 34 to enable it to offer gaming along the lines described above, a distributor (or other installer, which may of course include the manufacturer) of the gaming system configures the equipment in FIG. 34. The distributor thereafter installs it at venue 142 as shown in FIG. 34.

Before transporting the equipment to the venue, the distributor associates a serial number with each terminal, like terminals 144, 146, 148, 150 in FIG. 34. These serial numbers are entered into memory associated with and accessible by central system 160. The MAC address for each device is also entered. In addition, the charity associated with venue 142, the venue name, and a state gambling license for each are entered. Finally, a port on one of the real-time servers is associated with the venue by its port number and entered. As will be seen, each venue is associated with a different port number. This facilitates routing of messages.

In addition to the iPads, additional hardware, such as printer 152, when required, and router 156 are pulled from the distributor's inventory. The router is set with an SSID, which identifies the local area network at the venue. In addition password protection is also set up, and the iPads are configured to communicate with router 156.

Next the software that implements the games described above is installed, and the terminals are locked down. This limits the ability of the iPad to run programs other than the games described above.

The hardware so configured is delivered to the venue and installed. First, router 156 is connected to the Internet via and Internet Service Provider, which is typically contracted for by the hosting venue. The ISP assigns an IP address, which may be a CIDR (Classless Inter-Domain Routing) block address. After the address is assigned, the installer determines the address by, e.g., using web service such as www.whatismyip.com. After the address is determined, it is entered into central system 160. Security can be increased by placing a phone call to a work place maintained by the distributor, verbally communicating the IP address, and having that person manually enter the address into system 160 thereby associating it with the venue, which has already been identified in system 160, and with the other information that was entered by the distributor, which is described above.

In addition, system 160 associates one of real-time servers 166-172 with the site. This designates the server upon which data received from the site is first stored as it arrives at system 160. This is accomplished by assigning a different virtual port number for each site, which will be soon described. Finally, the venue is enabled and ready for play.

Before describing the procedure for initiating game play and the interaction of the hardware, further consideration needs to be given to the data packets that are generated at venue 142, the manner in which they are communicated to system 160, and how they are processed there. Venue 142 and system 160 are implemented with client-server architecture. The clients at venue 142 connect to central system 160 over Internet 158 using HTTPS over TCP/IP. None of the terminals can communicate with central system 160 unless their MAC addresses have been entered as described above. The Wi-Fi service enabled by router 156 uses WPA encryption.

The central system provides various web services that may be accessed in remote sites as well as a suite of functions that supply or support supply of games to players as described above. Data generated as a result is stored at central system 160 and may include financial data, player credit balances, game play history, and electronic pull-tab decks from which game outcomes are selected and delivered to a player terminal at venue 142 in response to game play there.

Here is an example to illustrate how data flows as described above. Assume the CIDR block address assigned to the venue is 8.2.4.2/31, and the IP address for firewall 164 is 66.172.18.11. In addition to each of these addresses, each real-time server 166-172 has an associated private-network address. Here assume real-time server 166 has the private-network address 10.1.8.2, real-time server 168 has 10.1.8.3, with each successive server continuing with additional private-network addresses.

It will be recalled that when venue 142 was configured, it was associated with a port number different from the virtual port number for any other venue. Every data packet coming from venue 142 includes that virtual port number, as part of the data carried by the packet but not as a socket address on firewall 166. Firewall 166 listens for packets from all of the venues on a single dedicated port, e.g., port 8080. As a result, the real socket to which all data from all of the venues is addressed is 66.172.18.11: 8080. What might be thought of as a virtual socket comprises the real IP address, 66.172.18.11, combined with the virtual port address, e.g., 66.172.18.11: 10,000.

When a data packet comes from venue 142 to system 160, firewall 160 checks its memory to determine whether the source address for the data packet is in the table that is created by adding each venue CIDR block address as the venue is configured and enabled for play. If the source address for the packet is not in this table, the packet is rejected. If it is in the table, the usual TCP handshake is performed to establish a connection.

Once the connection is established, the data packet is passed to the Usher real-time server, which controls packet distribution to the real-time server that is associated with the venue from which the packet originated. The Usher server receives all packets passed by the firewall. It maintains a table that associates the virtual port number in each data packet with the real-time server associated with the venue from which the data packet originated.

Considering the sequence described above, the data packet bearing socket destination address 66.172.18.11: 8080 is received at the firewall. Its origination address is the CIDR block number assigned to the venue, e.g., 8.2.4.2/31. The data packet also includes a port from which the packet originated, which is not relevant for our purposes. Once the packet is confirmed to be from a venue that is registered with system 160 it immediately routes to the Usher real-time server, which includes a table that associates each packet with a real-time server that is in turn associated with the venue from which the packet originated.

For example, two consecutive incoming data packets each have a real socket address of 66.172.18.11: 808. But the virtual socket addresses are 66.172.18.11: 10,000 and 66.172.18.11: 10,001. The port number 10,000 is associated with a first venue, e.g., Joe's Bar & Grill, from which that data packet originated; and the port number 10,001 is associated with a second venue, e.g., Katy's Fine Dining, from which that data packet originated.

Each of the virtual sockets is mapped to real socket on a different one of the real-time servers. Here, for example, are mappings on each of the two consecutive addresses:

66.172.18.11: 10,000→10.1.8.2: 8080

66.172.18.11: 10,001→10.1.8.3: 8080

As a result, data from each venue is routed to an associated real-time server. As an alternative to associating a virtual port number to a venue when the venue is configured, as described above, the system 160 can assign a virtual port number to the first packet received at firewall 164 from the site. The virtual port number can then be returned to the venue via the Internet, and all future communications from the venue can include the virtual port number. It should be noted that different types of services beyond providing pull-tab games could be provided to each or some of the venues. If so, other servers besides the pull-tab server, or in addition thereto, could be made available to the incoming data packets via appropriate entries in the Usher tables.

Some of the data collected from the venues and routed to the respective real-time servers is moved from there to central server 182. This permits the central server to be used to generate reports without slowing the real-time servers, which must be available to transact wagering and game play at each server's associated venue. All of the data is routed from each real-time server to the central server in a guaranteed delivery queue. This queue backs up if central server 182 is busy, and therefore slow to receive new data, or slow for a technical reason, or down, i.e., not receiving any data. When the central server is down, the queue for delivery of data from one of the real-time servers to the central server can back up and be quite long. It can take many minutes to clear the queue if the central server has been down.

Some data, e.g., all financial and wagering transactions, must be delivered and stored at the central server. As a result, this data goes only in the guaranteed-delivery queue. There is a second queue from each real-time server to the central server known as the priority delivery queue. Certain types of data that are not critical, e.g., are sent in a priority queue. Critical data, such as financial and wagering transactions must be delivered ultimately even if the central server is down. If down, the guaranteed delivery queue backs up and can take as much as three hours, or even longer to deliver once the central server is again operational. But this data is critical and must be preserved and stored regardless of the time when it arrives.

Data in the priority queue, however, is desirable to deliver quickly but would not prove disastrous if lost. One example of such data is related to employees who operate the cashier terminal. Because some venues operate multiple locations, e.g., a chain of restaurants, and have employees move from one location to another, records for each employee are stored on central server, including records relating to logging in and out as an operator of cashier terminal 150, which must occur before he or she can process transactions there. Each log-in command is sent via router 156, the Internet, and firewall 164 as described above to one of the real-time servers 166-172 associated with the venue at which the employee is attempting to log-in, and from there to central server 160, which stores employee records and responds to log-in commands.

If data in the guaranteed delivery queue is backed up, and the log-in commands were in that queue, the employee could not log-in as a result of the backed up queue that delays delivery to central server 160, which tracks and controls logging in and out. But log-in commands are in the priority queue. As a result, when the guaranteed delivery queue is backed up, e.g., after the central server has been down for a while, the priority queue delivers the log-in command much more quickly, thus allowing the employee to log-in.

On the other hand, if the central server is down, when the log-in attempt is made, the log-in command is lost as is any other data in the priority queue. That queue does not store and back up waiting commands; it just rapidly delivers whatever is in the queue, and if the server on the receiving end is down, that data is lost. But if the command were in the guaranteed-delivery queue, the log-in command could not happen either, so no harm is done, and logging in occurs quickly once the central server is up again, and a log-in command is sent.

But loss of financial data is unacceptable, and it must go in the guaranteed delivery queue. In some embodiments, certain types of data can go in both queues. In addition, some embodiments enable communications in both directions for both the priority and guaranteed queues.

Following are exemplary reports that can be compiled from data contained on the system and especially in the database associated with central server 160.

A Minnesota Electronic Pull Tab System
Active Deck Report
Sep. 9, 2012 12:34 AM
Active Decks

| Site ID | Game ID | Deck ID | Games Remaining | Game Name | Wager |
|---|---|---|---|---|---|
| 20012 | 1 | 1001 | 6 | Slideways 3 | $1.00 |
| 20012 | 1 | 1002 | 450 | Slideways 3 | $1.00 |
| 20012 | 2 | 1003 | 564 | Slideways 4 | $1.00 |
| 20012 | 2 | 1004 | 123 | Slideways 4 | $1.00 |
| 20012 | 2 | 1005 | 1234 | Slideways 4 | $1.00 |
| 20012 | 3 | 1006 | 6543 | Slideways 5 | $1.00 |
| 20012 | 3 | 1007 | 7412 | Slideways 5 | $1.00 |
| 20012 | 4 | 1008 | 4563 | Slideways 3 | $0.25 |
| 20012 | 4 | 1009 | 5412 | Slideways 3 | $0.25 |
| 20012 | 4 | 1010 | 256 | Slideways 3 | $0.25 |
| 20012 | 5 | 1011 | 7456 | Slideways 4 | $0.25 |
| 20012 | 5 | 1012 | 1756 | Slideways 4 | $0.25 |
| 20012 | 6 | 1013 | 368 | Slideways 5 | $0.25 |
| 20012 | 6 | 1014 | 956 | Slideways 5 | $0.25 |
| 21024 | 1 | 1101 | 6 | Slideways 3 | $1.00 |
| 21024 | 1 | 1102 | 450 | Slideways 3 | $1.00 |
| 21024 | 2 | 1103 | 564 | Slideways 4 | $1.00 |
| 21024 | 2 | 1104 | 123 | Slideways 4 | $1.00 |
| 21024 | 2 | 1105 | 1234 | Slideways 4 | $1.00 |
| 21024 | 3 | 1106 | 6543 | Slideways 5 | $1.00 |
| 21024 | 3 | 1107 | 7412 | Slideways 5 | $1.00 |
| 21024 | 4 | 1108 | 4563 | Slideways 3 | $0.25 |
| 21024 | 4 | 1109 | 5412 | Slideways 3 | $0.25 |
| 21024 | 4 | 1111 | 256 | Slideways 3 | $0.25 |
| 21024 | 5 | 1111 | 7456 | Slideways 4 | $0.25 |
| 21024 | 5 | 1112 | 1756 | Slideways 4 | $0.25 |

Report 1

Minnesota Electronic Pull Tab
Closed Deck Report
Sep. 4, 2012 thru Sep. 4, 2012

| Site ID | Name | Game ID | Name | Deck ID | Wager | Sold | Unsold | Payout | Open | Close |
|---|---|---|---|---|---|---|---|---|---|---|
| 141 | Roseville Bingo Hall | 3 | Sideways 3 $1.00 | 121 | $1.00 | 0 | 7500 | 0.00% | Aug. 30, 2012 | Sep. 04, 2012 |
| 141 | Roseville Bingo Hall | 3 | Sideways 3 $1.00 | 122 | $1.00 | 0 | 7500 | 0.00% | Aug. 30, 2012 | Sep. 04, 2012 |
| 142 | Memphis | 3 | Sideways 3 $1.00 | 123 | $1.00 | 0 | 7500 | 0.00% | Aug. 30, 2012 | Sep. 04, 2012 |
| 142 | Memphis | 3 | Sideways 3 $1.00 | 124 | $1.00 | 0 | 7500 | 0.00% | Aug. 30, 2012 | Sep. 04, 2012 |
| 141 | Roseville Bingo Hall | 4 | Sideways 3 $0.50 | 126 | $0.50 | 0 | 7500 | 0.00% | Aug. 30, 2012 | Sep. 04, 2012 |
| 141 | Roseville Bingo Hall | 4 | Sideways 3 $0.50 | 127 | $0.50 | 0 | 7500 | 0.00% | Aug. 30, 2012 | Sep. 04, 2012 |
| 142 | Memphis | 4 | Sideways 3 $0.50 | 128 | $0.50 | 0 | 7500 | 0.00% | Aug. 30, 2012 | Sep. 04, 2012 |
| 142 | Memphis | 4 | Sideways 3 $0.50 | 129 | $0.50 | 0 | 7500 | 0.00% | Aug. 30, 2012 | Sep. 04, 2012 |
| 141 | Roseville Bingo Hall | 30 | Sideways 3 $2.00 | 131 | $2.00 | 0 | 7500 | 0.00% | Aug. 30, 2012 | Sep. 04, 2012 |

-continued

Minnesota Electronic Pull Tab
Closed Deck Report
Sep. 4, 2012 thru Sep. 4, 2012

| Site ID | Site Name | Game ID | Game Name | Deck ID | Wager | Sold | Unsold | Payout | Open | Close |
|---|---|---|---|---|---|---|---|---|---|---|
| 141 | Roseville Bingo Hall | 30 | Sideways 3 $2.00 | 132 | $2.00 | 0 | 7500 | 0.00% | Aug. 30, 2012 | Sep. 04, 2012 |
| 142 | Memphis | 30 | Sideways 3 $2.00 | 133 | $2.00 | 0 | 7500 | 0.00% | Aug. 30, 2012 | Sep. 04, 2012 |
| 142 | Memphis | 30 | Sideways 3 $2.00 | 134 | $2.00 | 0 | 7500 | 0.00% | Aug. 30, 2012 | Sep. 04, 2012 |
| 141 | Roseville Bingo Hall | 12 | Treasures of the Jungle $1.00 | 136 | $1.00 | 0 | 7500 | 0.00% | Aug. 30, 2012 | Sep. 04, 2012 |
| 141 | Roseville Bingo Hall | 12 | Treasures of the Jungle $1.00 | 137 | $1.00 | 0 | 7500 | 0.00% | Aug. 30, 2012 | Sep. 04, 2012 |
| 142 | Memphis | 12 | Treasures of the Jungle $1.00 | 138 | $1.00 | 0 | 7500 | 0.00% | Aug. 30, 2012 | Sep. 04, 2012 |
| 142 | Memphis | 12 | Treasures of the Jungle $1.00 | 139 | $1.00 | 0 | 7500 | 0.00% | Aug. 30, 2012 | Sep. 04, 2012 |
| 141 | Roseville Bingo Hall | 34 | Treasures of the Jungle $2.00 | 141 | $2.00 | 0 | 7500 | 0.00% | Aug. 30, 2012 | Sep. 04, 2012 |
| 141 | Roseville Bingo Hall | 34 | Treasures of the Jungle $2.00 | 142 | $2.00 | 0 | 7500 | 0.00% | Aug. 30, 2012 | Sep. 04, 2012 |
| 142 | Memphis | 34 | Treasures of the Jungle $2.00 | 143 | $2.00 | 0 | 7500 | 0.00% | Aug. 30, 2012 | Sep. 04, 2012 |
| 142 | Memphis | 34 | Treasures of the Jungle $2.00 | 144 | $2.00 | 0 | 7500 | 0.00% | Aug. 30, 2012 | Sep. 04, 2012 |
| 141 | Roseville Bingo Hall | 15 | Old Glory $1.00 | 146 | $1.00 | 0 | 7500 | 0.00% | Aug. 30, 2012 | Sep. 04, 2012 |
| 141 | Roseville Bingo Hall | 15 | Old Glory $1.00 | 147 | $1.00 | 0 | 7500 | 0.00% | Aug. 30, 2012 | Sep. 04, 2012 |
| 142 | Memphis | 15 | Old Glory $1.00 | 148 | $1.00 | 0 | 7500 | 0.00% | Aug. 30, 2012 | Sep. 04, 2012 |

Report 2

A Minnesota Electronic Pull Tab System
Charity List With Sites
Sep. 9, 2012 12:34 AM

| | License Number | | Address | City/State/Zip | Phone |
|---|---|---|---|---|---|
| | Website | | Charity Manager | Email | Phone |
| Charity Name | Site ID | Site Name | Address | City/State/Zip | Phone |
| American Legion | 123ABC | | 1234 Legion Drive | Somewhere, MN 98765-4321 | (987)555-1212 |
| | www.americanlegion.org | | Charles Smith | csmith@americaniegion.org | (234)567-8900 |
| | 21010 | Joe's Bar | 123 Second Street | Somewhere, MN 98765 | (897)321-9876 |
| | 21013 | Clay's Club | 223 Second Street | Somewhere, MN 98765 | (897)321-9855 |
| | 21014 | Vacation Bar | 128 Second Street | Somewhere, MN 98765 | (897)321-4566 |
| | 21017 | Mary's Lounge | 143 Second Street | Somewhere, MN 98765 | (897)321-3456 |
| Minnesota School | 456XYZ | | 5678 Minnesota Street | Elsewhere, MN 98745-4321 | (456)555-1212 |
| for the Deaf | www.mndeafandblindschool.org | | Andrea Longeens | andreal@gmail.com | (654)598-1123 |
| | 21011 | Frank's Bar and Grill | 376 Third Street | Elsewhere, MN 98745 | (827)221-9226 |
| | 21023 | Plano Lounge | 223 Third Street | Elsewhere, MN 98745 | (827)322-9225 |
| | 21034 | Golf Bar | 6548 Country Club Drive | Elsewhere, MN 98745 | (896)226-6666 |
| Veterans of | 789OLMNOP | | 9876 Veterans Road | Someplace, MN 98654-4321 | (447)544-1442 |
| Foreign Wars | www.vfw.org | | Captain John Johnson | cjj@vfw.org | (254)565-8955 |
| | 21035 | Blamey Club | 113 Broadway | Someplace, MN 98854 | (867)361-9676 |
| | 21039 | Viking's Dan | 223 Underbally Drive | Someplace, MN 98854 | (797)971-7755 |
| | 21047 | The Brass Bar | 7762 Second Street | Someplace, MN 98854 | (887)821-4588 |

Report 3

A Minnesota Electronic Pull Tab System
Deck Inventory Report
Sep. 9, 2012 12:34 AM
Decks Inventory

| Game Name | Wager | Game ID | Inventory |
|---|---|---|---|
| Slideways 3 | $1.00 | 1 | 30 |
| Slideways 4 | $1.00 | 2 | 30 |
| Slideways 5 | $1.00 | 3 | 30 |
| Slideways 3 | $0.25 | 4 | 30 |
| Slideways 4 | $0.25 | 5 | 30 |
| Slideways 5 | $0.25 | 6 | 30 |

Report 4

A Minnesota Electronic Pull Tab System
View Game Details
Sep. 9, 2012 12:34 AM

| | |
|---|---|
| Game Name: | Slideways 3 |
| Wager: | $1.00 |

-continued

A Minnesota Electronic Pull Tab System
View Game Details
Sep. 9, 2012 12:34 AM

| | |
|---|---|
| Game ID: | 1 |
| Manifest File: | games/slide3.txt. |
| Status: | Approval Pending |
| Games Per Deck: | 7500 |
| Total Cost Of Games: | $7500.00 |
| Total Prize Value: | $6375.00 |
| Prize %: | 85.00% |
| Prize Frequency: | 4.43% |

Prize Table

| Number | Prize |
|---|---|
| 1 | $599.00 |
| 5 | $500.00 |
| 20 | $100.00 |
| 40 | $ 20.00 |
| 15 | $ 5.00 |
| 150 | $ 2.00 |
| 101 | $ 1.00 |

Report 5

Minnesota Electronic Pull Tab system
Game Performance Report
Period: Jan. 1, 2013-Jan. 31, 2013

| Game Name | Wager | Game ID | Average Net Win Per Day | Sales # | Sales $ | Prizes # | Prizes $ | Prize % |
|---|---|---|---|---|---|---|---|---|
| Active Games | | | | | | | | |
| Slideways 3 | $1.00 | 1 | $765.43 | 543 | $ 543.00 | 23 | $ 460.00 | 84.71% |
| Slideways 4 | $1.00 | 2 | $654.32 | 1678 | $1678.00 | 265 | $1460.00 | 87.00% |
| Slideways 5 | $1.00 | 3 | $543.21 | 2103 | $2103.00 | 245 | $1765.00 | 83.93% |
| Slideways 3 | $0.25 | 4 | $432.10 | 1543 | $ 385.75 | 29 | $ 320.25 | 83.02% |
| Slideways 4 | $0.25 | 5 | $321.98 | 2285 | $ 571.25 | 123 | $ 485.50 | 84.99% |
| Slide ways 5 | $0.25 | 6 | $219.87 | 11026 | $2756.50 | 1012 | $2333.25 | 84.65% |
| Disabled Games | | | | | | | | |
| Tic-tac-toe | $0.25 | 7 | $ 12.34 | 6543 | $1635.75 | 578 | $1382.00 | 84.49% |
| Chess | $0.25 | 8 | $ 10.98 | 10567 | $2641.75 | 1011 | $2235.75 | 84.63% |

Report 6

A Minnesota Electronic Pull Tab System
Pull Tab Games
Sep. 9, 2012 12:34 AM
Games

| Game Name | Wager | Game ID | Manifest File | Status | Action |
|---|---|---|---|---|---|
| Slideways 3 | $1.00 | 1 | games/slide3.txt | Active | |
| Slideways 4 | $1.00 | 2 | games/slide4.txt | Active | |
| Slideways 5 | $1.00 | 3 | games/slide5.txt | Active | |
| Slideways 3 | $0.25 | 4 | games/slide3.txt | Active | |
| Slideways 4 | $0.25 | 5 | games/slide4.txt | Active | |
| Slideways 5 | $0.25 | 6 | games/slide5.txt | Active | |
| Tic-tac-toe | $0.25 | 7 | games/ttt.txt | Disabled | |
| Chess | $0.25 | 8 | games/chess.txt | Disabled | |
| Tic-tac-toe | $1.00 | 9 | games/ttt.txt | Approval Pending | |
| Chess | $1.00 | 10 | games/chess.txt | Approval Pending | |

Report 7

Minnesota Electronic Pull Tab
Financial Report

| Charity Name<br>Site ID | License<br>Site Name | License | PTs | Tickets | Prizes | Net | Pay % | Sells $/# | Redms $/# | Exp $/# |
|---|---|---|---|---|---|---|---|---|---|---|
| Period: Aug. 04, 2012-Aug. 04, 2012 | | | | | | | | | | |
| Jarrod's Charity | C00025 | | | | | | | | | |
| 144 | Jarrod's Piace | s00023 | 1 | 286.50 | 193.20 | 93.30 | 67.43% | 1,100.00/2 | 919.10/1 | 87.60/1 |
| Charity Total | | | 1 | 286.50 | 193.20 | 93.30 | 67.43% | 1,100.00/2 | 919.10/1 | 87.60/1 |
| Lions Club #10 | 1200-23 | | | | | | | | | |
| 142 | Memphis | 012- | 0 | 0.00 | 0.00 | 0.00 | 0.00% | 0.00/0 | 0.00/0 | 0.00/0 |
| 143 | O'Malley's Irish | 012- | 0 | 0.00 | 0.00 | 0.00 | 0.00% | 0.00/0 | 0.00/0 | 0.00/0 |
| Charity Total | | | 0 | 0.00 | 0.00 | 0.00 | 0.00% | 0.00/0 | 0.00/0 | 0.00/0 |
| MN Cancer | 012-548-RC | | | | | | | | | |
| 143 | Roseville Bingo | 012-485- | 0 | 0.00 | 0.00 | 0.00 | 0.00% | 0.00/0 | 0.00/0 | 0.00/0 |
| Charity Total | | | 0 | 0.00 | 0.00 | 0.00 | 0.00% | 0.00/0 | 0.00/0 | 0.00/0 |
| Period: Sep. 04, 2012-Sep. 04, 2012 | | | | | | | | | | |
| Muscular Dystrophy | 002 | | | | | | | | | |
| 137 | Elks Lodge | 102 | 4 | 94.00 | 128.00 | −34.00 | 136.17% | 100.00/1 | 0.00/0 | 134.00/1 |
| 138 | VFW Hall #121 | 1975- | 0 | 0.00 | 0.00 | 0.00 | 0.00% | 0.00/0 | 0.00/0 | 0.00/0 |
| Charity Total | | | 4 | 94.00 | 128.00 | −34.00 | 136.17% | 100.00/1 | 0.00/0 | 134.00/1 |
| Rotary Club #2 of | 2100-105 | | | | | | | | | |
| 140 | White Stag Bar & | 012-546- | 0 | 0.00 | 0.00 | 0.00 | 0.00% | 0.00/0 | 0.00/0 | 0.00/0 |
| Charity Total | | | 0 | 0.00 | 0.00 | 0.00 | 0.00% | 0.00/0 | 0.00/0 | 0.00/0 |
| Sanitary Fund | 10900 | | | | | | | | | |
| 136 | Duffy's Tavern | 162990 | 2 | 0.00 | 0.00 | 0.00 | 0.00% | 0.00/0 | 0.00/0 | 0.00/0 |
| Charity Total | | | 2 | 0.00 | 0.00 | 0.00 | 0.00% | 0.00/0 | 0.00/0 | 0.00/0 |
| Travis | Travis | | | | | | | | | |
| 135 | Travis's Site | 42424242 | 0 | 0.00 | 0.00 | 0.00 | 0.00% | 0.00/0 | 0.00/0 | 0.00/0 |
| Charity Total | | | 0 | 0.00 | 0.00 | 0.00 | 0.00% | 0.00/0 | 0.00/0 | 0.00/0 |
| Total | | | 7 | 380.50 | 321.20 | 59.30 | 54.42% | 1,200.00/3 | 919.10/1 | 221.60/2 |

Report 8

Total Number of Charities 7

Total Number of Sites 9

A Minnesota Electronic Pull Tab System
Site Configuration Sheet
Sep. 9, 2012 12:34 AM
Site Details for Acres 4.0 Bar and Grill

| Site Information | |
|---|---|
| Name: | Acres 4.0 Bar and Grill |
| Address: | 1234 Tenaya Way |
| City/State/Zip: | Las Vegas, NV 12345-6789 |
| Phone: | (702)555-1212 |
| Email: | manager@a4barandgrill.com |
| Website: | www.a4barandgrill.com |
| Site ID: | 20001 |
| License Number: | 654POI |
| Site Cashier Username: | Acres 4.0 Bar and Grill Cashier 1 |
| Site Cashier Password: | 9875 |
| Site status: | Disabled |
| Site Install Date: | Sep. 1, 2012 |

| Equipment Details | |
|---|---|
| WiFi Router SSID: | Acres20001 |
| WiFi Router Username: | Acres 4.0 |
| WiFi Router Password: | AcresRocks |
| GLA MAC Address: | 11:22:33:44:55:66 |
| Number of Point Of Sale Terminals: | 1 |
| Point Of Sale Terminal Serial Number: | CVX45LJ32Z |
| Number of Player Terminals: | 6 |
| Player Terminal Serial Number: | CVX45LJ33Z |
| Player Terminal Serial Number: | CVX45LJ34Z |
| Player Terminal Serial Number: | CVX45LJ35Z |
| Player Terminal Serial Number: | CVX45LJ36Z |
| Player Terminal Serial Number: | CVX45LJ37Z |
| Player Terminal Serial Number: | CVX45LJ38Z |

Report 9

Consideration will now be given to the manner in which game outcomes are generated and selected. The basic game play unit in a pull-tab game is referred to as a deck of pull-tab outcomes, i.e., symbol combinations and associated prize amounts, if any. In a deck every card, i.e., outcome and any associated prize amount, has the same purchase price. There are a predefined number of winning cards as well as a predefined cumulative prize amount in the deck. A plurality of decks may be generated using a single set of deck criteria, which may be referred to as a game ID. In some jurisdictions the criteria for generating a deck may be known as a Form Number or Game Set. Regardless of nomenclature, the game ID typically includes the following:

- Number of tickets in the deck
- Name of the game
- Description
- Version
- Manufacturer
- Price of a card/ticket
- Table of prize amounts, each with a total number of occurrences in the deck Each deck generated with a game ID has the same predefined number of winning cards and the same cumulative prize total. The game ID may be generated using known mathematical techniques for designing wagering games. Different game IDs can be used to create decks that provide different prize-amount volatility and different wager amounts.

To create a deck, a copy of the prize table from a game ID is made. The prize table includes the number of occurrences for each different game prize amount, including outcomes that are a loss. Put differently, the prize table is a list of all possible prize amounts—including a loss where $0 is awarded—in the deck to be generated and the number of times each prize amount occurs in the deck. In the present embodiment, each deck includes 7,500 possible outcomes.

Next, a different one of the prizes is randomly selected from the prize table and placed in the deck under construction. Each prize, including the losses, is placed in sequential order until all of the prizes are gone from the copy of the prize table. In other words, these selections are made without replacement. This leaves a deck with 7,500 records, each of which includes a prize amount.

A rendering table associated with the game ID includes a plurality of different game outcomes, which are often in the form of symbol combinations for a revealed tab, but may also include bonus outcomes, such as those associated with Treasures of the Jungle. The outcomes are grouped according to the prize amount associated with each. In other words, each outcome within a group has one and only one prize amount. After the game ID is used to initiate the deck build as described above, each of the 7,500 entries (each defining a prize amount) is considered in sequence. For each entry, a random selection of a game outcome is chosen from the group of outcomes that have the current prize amount in the deck. After being so chosen, the outcome is associated with the entry under consideration. After moving through the entire deck, the cards each include a prize amount and an outcome that corresponds to the prize amount.

During game play, each time a player wagers, a card is chosen in sequence and the outcome and associated prize are displayed to the player.

As an example, suppose a game ID has the following prize-amount distribution:

TABLE 1

| Prize Level | Weight (Number of Occurrences) | Prize Amount |
|---|---|---|
| 0 | 5 | $0 |
| 1 | 2 | $1 |
| 2 | 1 | $5 |
| Total | 8 | |

In the above table, the prize level is a number for linking prize amounts in a deck to a game outcome, as will be shortly seen. First, create a working distribution based upon the game ID:

TABLE 2

| Prize Level | Weight |
|---|---|
| 0 | 5 |
| 1 | 2 |
| 2 | 1 |
| Total | 8 |

The algorithm for randomly populating a deck with prize values begins with choosing a random number, N, from 0 to X−1, where X is the sum of the weights in the working distribution. Next, loop through all the weights, and consider whether N is less than the current weight. If so, the prize associated with this weight is chosen. If not, then advance the current weight from N to the next weight. Keep repeating, until N is less than the current weight. When that happens, chose the prize at that weight, save it in the current position, and deduct 1 from the weight in the working distribution. This process is repeated for each prize until the working distribution is empty.

For example, considering the above table, begin with choosing a random number between 0 and total weight (8) minus 1 (7). A Java based RNG using the well-known KISS algorithm is used for random selection. Suppose 3 is randomly chosen. Start by looping through the prize levels, first inspecting prize level 0. The current weight for prize level 0 is 5. The random number chosen was 3. 3 is less than 5, so prize level 0 is the prize being drawn. Deduct 1 weight from Prize level 0, which results in the following working distribution:

TABLE 3

| Prize Level | Weight |
|---|---|
| 0 | 4 |
| 1 | 2 |
| 2 | 1 |
| Total | 7 |

The deck at this point has one prize and it looks like:

TABLE 4

| Prize Index | Prize Level |
|---|---|
| 0 | 0 |

To draw the next prize, choose a random number between 0 and the current weight (7) minus 1 (6). Suppose 6 is chosen. Again loop through the prize levels, first inspecting prize level 0. The current weight for prize level 0 is 4. The random number chosen was 4. 6 is not less than 4, so prize level 0 is not the prize being drawn. Subtract from the random number the weight of the current prize level (4), which yields a difference of 2. Iterate to the next prize level. 2 is not less than 2, so prize level 1 is not the prize being drawn. Subtract from the random number the weight of the current prize (2), which yields a difference of 0. Iterate to the next prize level. 0 is less than 1, so prize level 2 is the prize being drawn. Deduct 1 weight from Prize level 2, which results in the following working distribution:

TABLE 5

| Prize Level | Weight |
|---|---|
| 0 | 4 |
| 1 | 2 |
| 2 | 0 |
| Total | 6 |

TABLE 6

| Prize Index | Prize Level |
|---|---|
| 0 | 0 |
| 1 | 2 |

This process is repeated until the total weights reaches 0, which means that all the individual weights have amounts of 0.

Continuing the process, a final deck may have an arrangement as:

TABLE 7

| Prize Index | Prize Level |
|---|---|
| 0 | 0 |
| 1 | 2 |
| 2 | 0 |
| 3 | 0 |
| 4 | 1 |
| 5 | 1 |
| 6 | 0 |
| 7 | 0 |

Joining the game ID prize amounts, which correspond to the Prize Index, with the resulting Deck would yield the following:

TABLE 8

| Prize Index | Prize Level | Prize Amount |
|---|---|---|
| 0 | 0 | $0 |
| 1 | 2 | $5 |
| 2 | 0 | $0 |
| 3 | 0 | $0 |
| 4 | 1 | $1 |
| 5 | 1 | $1 |
| 6 | 0 | $0 |
| 7 | 0 | $0 |

Now a game outcome must be rendered for each prize index. Suppose that that the rendering table for prize level 0 is as follows:

TABLE 9

| Render # | Weight | Rendering |
|---|---|---|
| 0 | 2 | bar-bar-seven |
| 1 | 2 | bar-seven-bar |
| 2 | 2 | seven-bar-bar |
| 3 | 1 | bar-seven-seven |
| 4 | 1 | seven-bar-seven |
| 5 | 1 | seven-seven-bar |
| Total | 9 | |

The rendering table is typically a subset of all the possible renderings for a prize level, which correlates to a prize amount. It is a subset because there can be many, sometimes billions, total possible outcomes, e.g., for a multiple tab game with a bonus. The above rendering table in Table 9 can be used to associate a game outcome, symbol combinations and/or bonus result, with each award in the partially completed deck shown in Table 8.

This is accomplished using the same algorithm that populated the deck with prize values. Choose a random number from 0 to total weight (9) minus 1 (8). Suppose 4 is chosen. Iterate though all the renderings. Render 0 has a weight of 2. 4 is not less than 2, so deduct the weight of render 0 (2) from the random number (4) to yield 2. Iterate to the next render (1). Inspect the weight of Render 1, which is 2. 2 is not less than 2, so deduct the weight of render 1 (2) from the random number (2) to yield 0. Iterate to the next render (2), which has a weight of 2. 0 is less than 2, so render 2 is the rendering to apply to the current prize level 0 in the deck. So, this prize will use the rendering of "seven-bar-bar". This same process is completed for each prize index until the deck is complete. The processes for generating the prize values and associated rendered outcomes can be done in any order, e.g., one first entirely and then the second, or each can be completed one after the other when generating each record in the deck.

In the present embodiment of the system, decks are generated and stored in an inventory of decks in the system memory. This memory is automatically monitored and when decks run low, new decks are automatically generated according to the algorithm above, mostly after 2 AM and before 8 AM when gaming is either light or non-existent due to regulations that limit gaming hours.

Finishing now the description of one more aspect of the present implementation, a session ticket 186 in FIG. 36 was printed by printer 152 in FIG. 34. A game manager at venue 142 printed ticket 186. The game manager operates cashier terminal 150 and dispenses session tickets via the printer, in this case in exchange for the start value printed on ticket 186. Tickets may be issued in other amounts.

Each ticket has the information printed as shown on ticket 186, including a QR code 188. After purchasing the session ticket, a player uses it with a player terminal, like device 62 from FIG. 13, to load with credits for game play. Before any play, there is a touch-sensitive button that says "Add Credits." When pressed, device 62 turns on the camera in device 62 thus activating lens 66. In addition, the device displays an alignment grid 190 that includes corner frames 192, 194, 196, 198, and a nonfunctional image of a QR code 200.

When the player, not shown in FIG. 37, moves session ticket 186 in position as shown over device 62 an image 202 of the printed matter on the ticket appears on screen 64. This results from the ticket moving over lens 66. As the player continues moving ticket 186 in the direction of arrow 204 the QR code image captured by lens 66 and displayed on screen 64 approaches alignment with image 200. Doing so triggers QR code recognition software in device 62. The QR code software interfaces with the game software in a way that applies the credit amount on the ticket to an account on the central system that is associated with the device. Current account value is then reflected to the device. Alternatively, or in addition, the account on the central system may be associated with a player using player-tracking technology. Thereafter, the player can choose one of the games as described above, which will have $80 credit applied to his or her associated account on the central system and begin playing the game.

In addition to applying credits to a game, a QR code can be used to scan a player's card for player tracking purposes. This is necessary here, because these devices do not have card readers, and it may be desirable not to add them.

The system stores all wagers and awards, and debits or credits the account created by the deposit for ticket 186 accordingly. At the conclusion of play, the player returns with ticket 186 to the game manager who scans it, in a manner similar to that described in connection with FIG. 37, on his or her cashier terminal. This indicates the concluding amount in the account, which is given to the player in exchange for the ticket.

Alternatively, instead of issuing a ticket, the game manager receives money from a player and opens an account with an initial cash deposit made by the player. This account is opened on cashier terminal 150, which communicates with the system to apply a credit in the amount of the deposit to a player's account, which is on the central system. The account is identified by the manager with a play terminal, which the manager then gives to the player with the associated credit. The amount of this credit is reflected by the central system to the credit meter on the device. The player then commences wagering and playing as described above. When the player concludes gaming, he or she returns their player's terminal to the game manager who reviews the amount stored in the account by the system, using the cashier terminal. This amount is given to the player when the player terminal is returned to the game manager.

Figure 38:
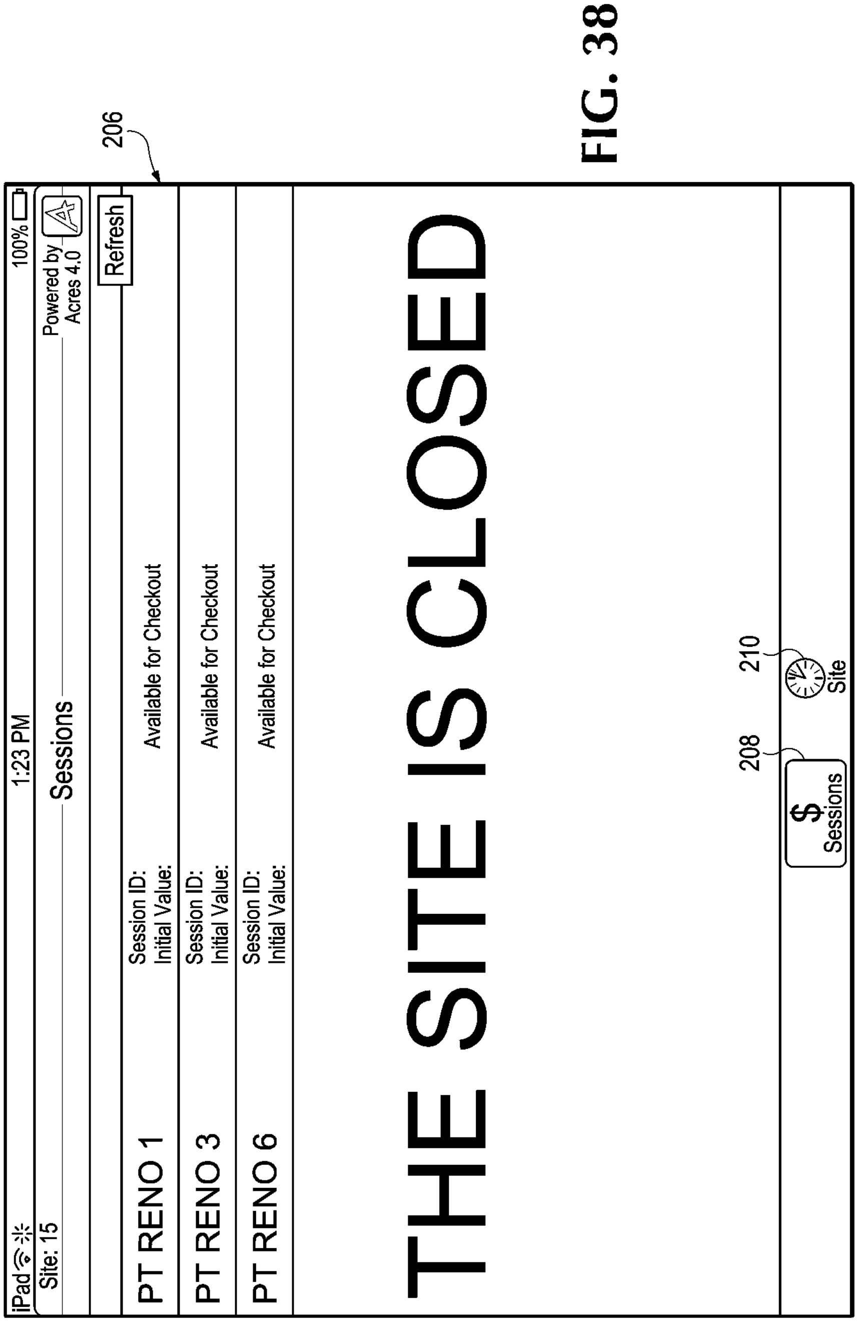
FIGS. 38-44 are views of different screen displays on the cashier terminal.

Consideration will now be given to some of the screen displays that appear on cashier terminal 150 in the course of selling sessions, during active sessions, and cashing out a player. FIG. 38 is a screen display 206 that appears on cashier terminal 150 before a manager logs into terminal 150. Terminal 150 has two display modes—session mode and control mode. The control mode is used for logging in and out, locking terminal 150, generating reports, and changing passwords. Icons 208, 210 may be used to switch between the modes.

Figure 39:
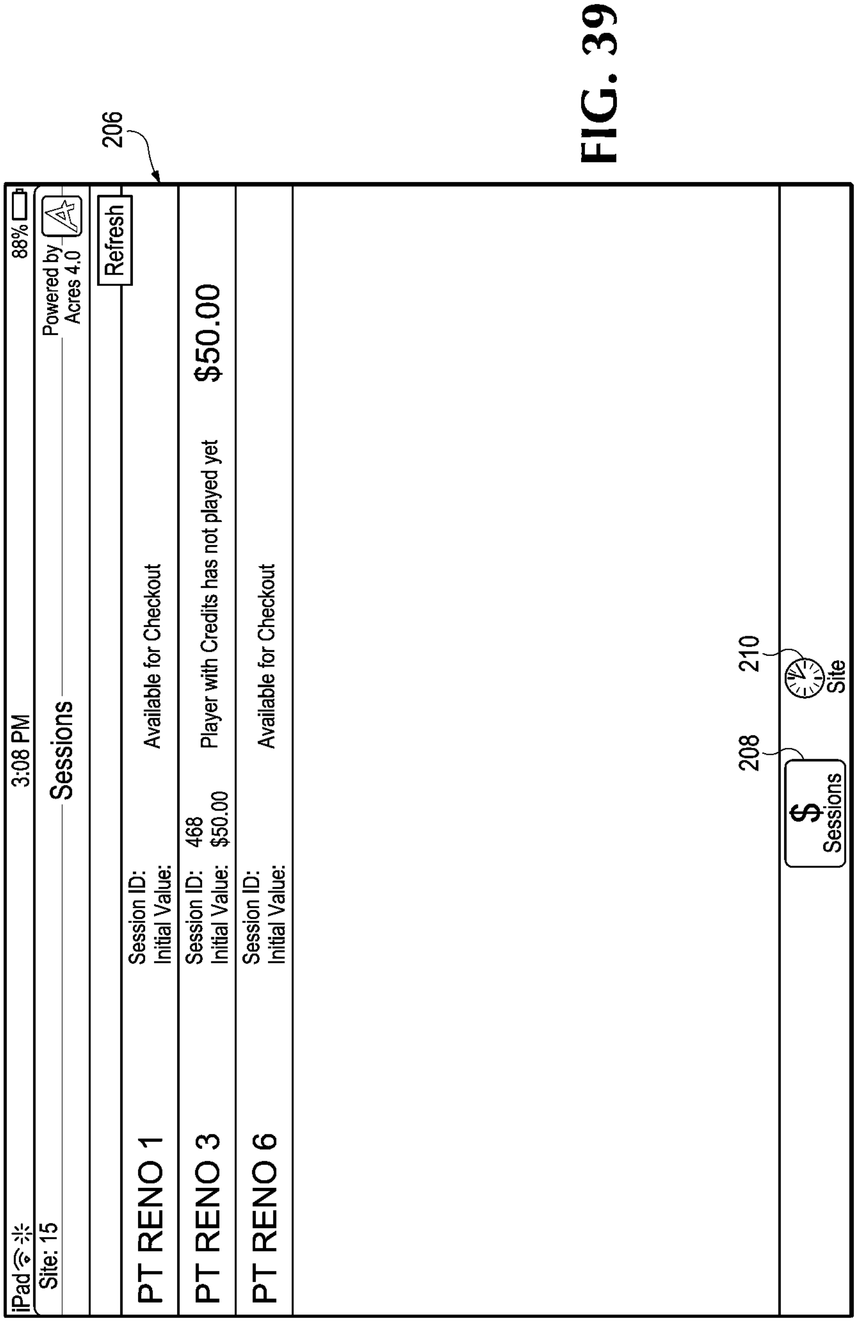

As can be seen in FIG. 38, showing the screen prior to activating any sessions, and FIG. 39, showing the screen with one active session, there is a line for each player terminal, like player terminals 144, 146, 148 in FIG. 34. Each line includes the player terminal name, a session ID for any active session, the initial value for any active session, and session status, including current cash value.

Player terminals can be powered up at any time. They may be connected to power or run on batteries. When they are powered up, each terminal may request an update download. If an update is available, an ACCEPT button (not shown) is presented to the operator. After pressing the download button, an update is downloaded from the central system to the player terminal.

Figure 40:
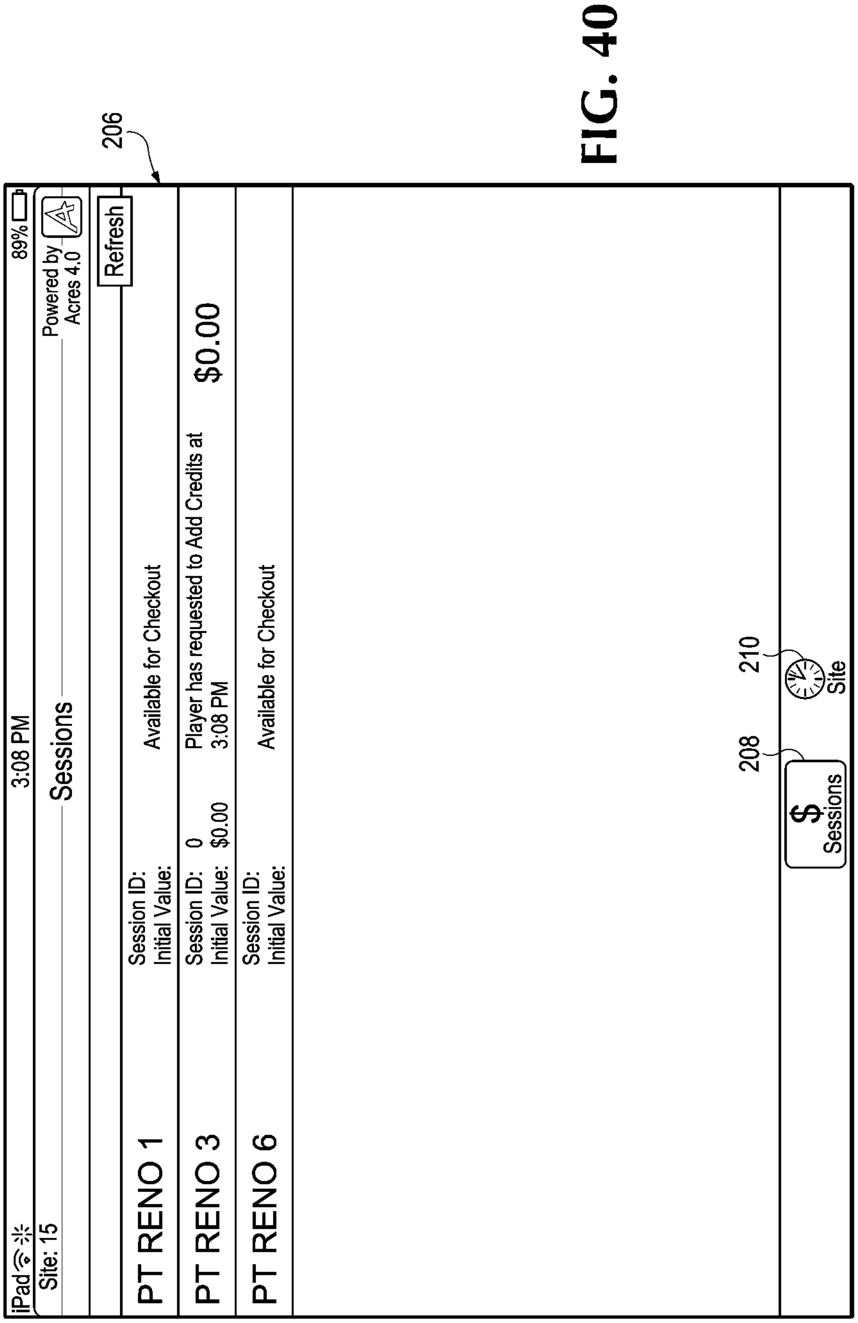

In FIGS. 39 and 40, each player line may have a different color. Grey means the device has no active session and is available for play. All of the lines in FIG. 38 are grey, as are the lines for PT RENO 1 and PT RENO 6 in FIGS. 39 and 40. Green means the device has a session active and has had play in the last 5 minutes. Red means the player has requested service, either cash out or add cash. PT RENO 3 is red in FIG. 40. And yellow means the device has an active session, but has not been played or has not been active for 5 minutes. PT RENO 3 is yellow in FIG. 39.

Figure 41:
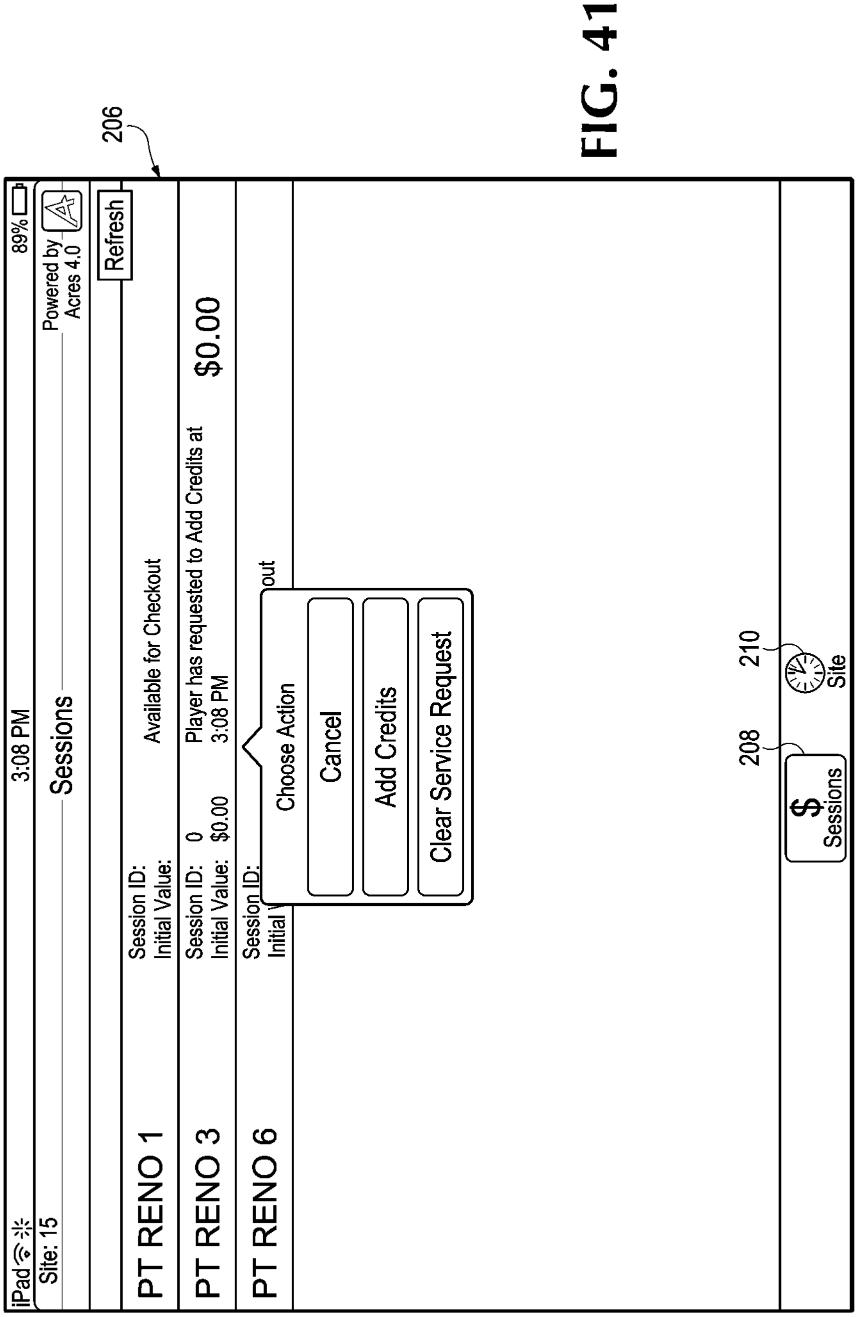
Figure 42:
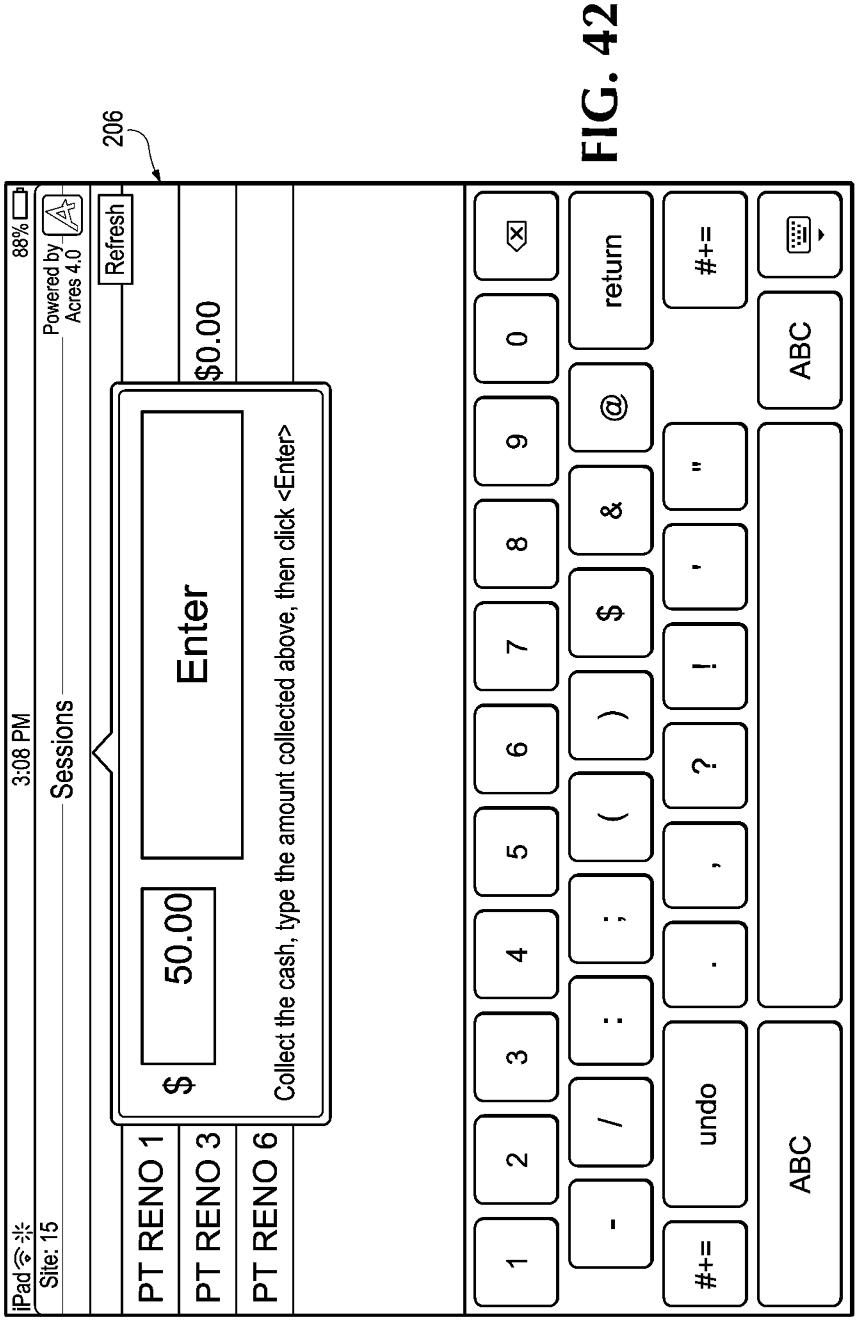

When the player desires to use a player terminal, the player needs to buy a session from the manager, i.e., the operator of cashier terminal 150. When buying a session or adding cash to an ongoing session, either the player or the operator must press the HELP button in FIGS. 14-18, which may alternatively be labeled ADD CASH. After so doing, the line associated with the player terminal that made the request, PT RENO 3 in FIG. 41, turns red and displays "Player has requested to add credits at [time of request.]" Touching the red area brings up a selection menu that permits the operator to choose ADD CREDITS, at which time the cashier should collect the desired amount from the patron and enter the amount into the displayed window. Thereafter, screen display 206 appears as in FIG. 42, and the associated player terminal is ready to play.

Figure 43:
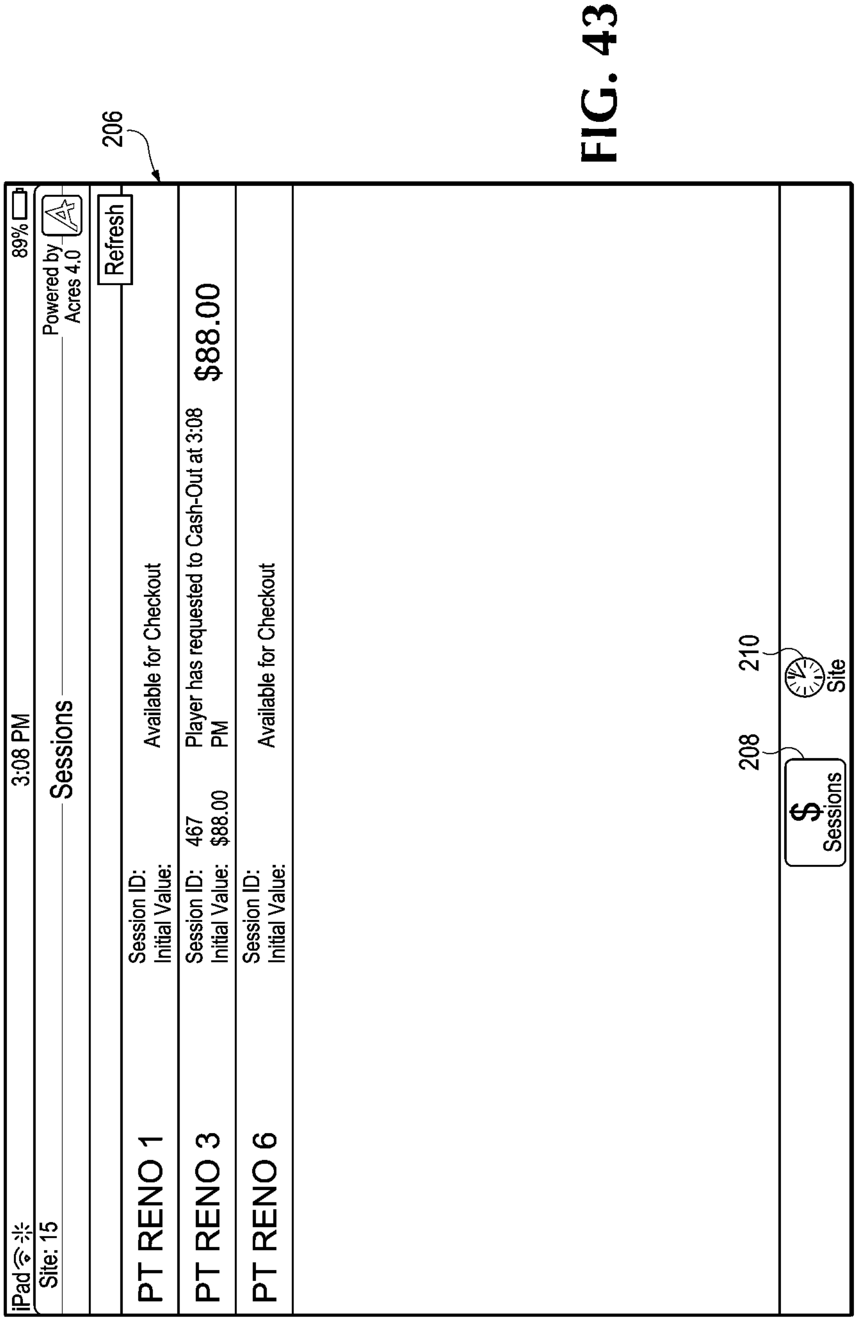
Figure 44:
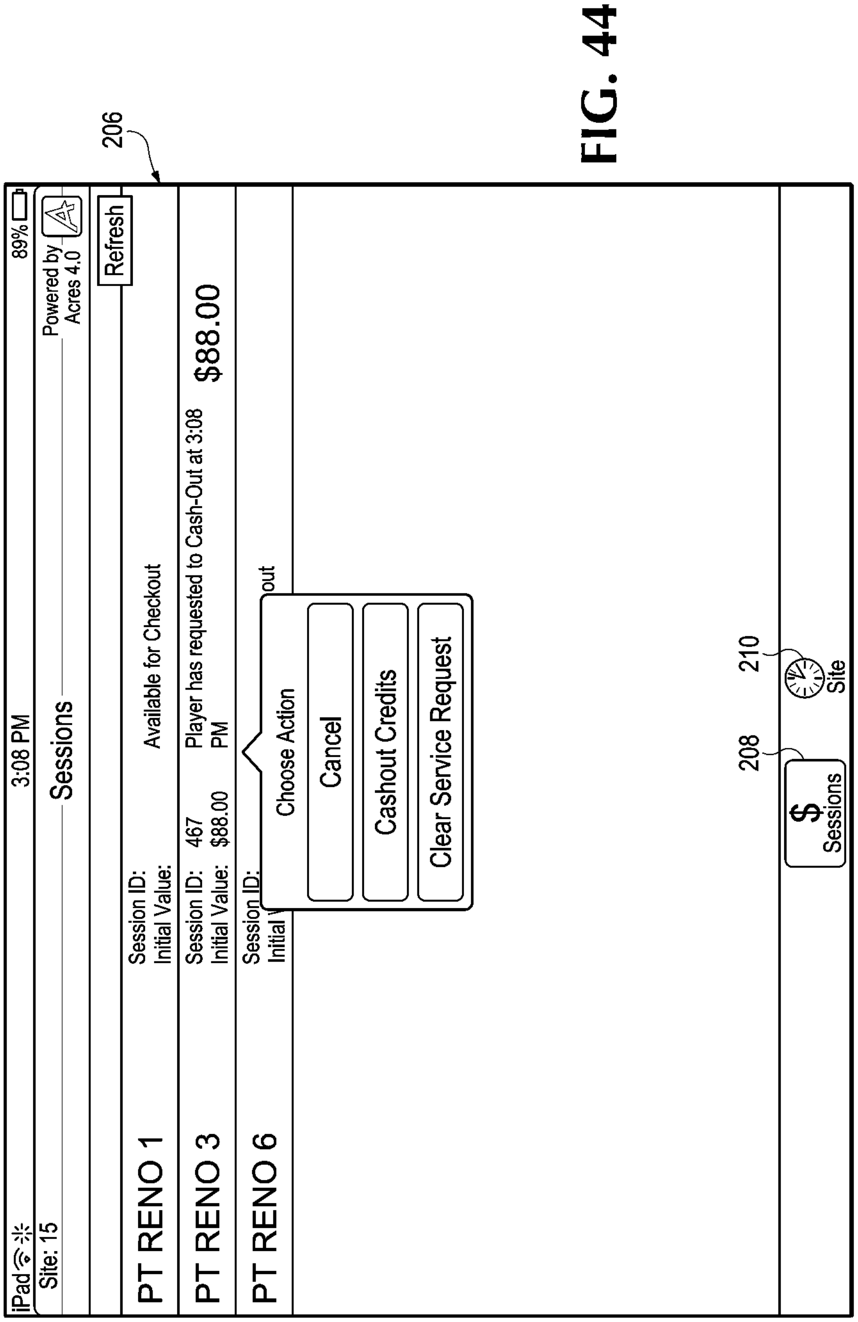

When a player desires to cash out, he or she selects that function button in one of the displays of FIGS. 14-18. This causes the associated line on display 206 to turn red as shown in FIG. 43 for PT RENO 3. When the operator touches the red line on the display, a selection menu appears as shown in FIG. 44. After touching the Cashout Credits button, the operator pays the player the amount shown on the right in the red line.

The system can monitor the condition of each player terminal because it is receiving wagers and providing cards from the deck in play. Each player terminal generates a token that is included with each data packet sent to the system.

This permits the system to track wagers, awards, and game play. If the player terminal remains idle for longer than a predefined time, a message appears indicating to the player that he or she should play or return the terminal and cash out. The predefined time can vary depending on how many terminals are out. If 3 of 6 are out, a longer time can be used. But if all terminals are out, a shorter time is more effective to keep game play going on the terminals.

Also, this could escalate. In other words, if the initial message doesn't either get the player to start playing or return the terminal and cash out, the operator or a staff person who is notified by the operator or by the color codes on cashier terminal 150 could track the player down and inquire about problems, desire for further gaming, etc.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A method of operating games implemented on a network of mobile computing devices, at least some of which have a screen and a camera comprising:

installing an application on a plurality of the mobile computing devices for reading an optical machine-readable code;

accounting for money deposits made by players of the games;

generating an optical machine-readable code for each player, the code including data corresponding to the amount of each player's deposit;

providing a different one of the mobile computing devices to each of a plurality of players;

providing each player with his or her respective code;

receiving an image of one of the generated codes via the camera on one of the provided mobile computing devices;

applying a wagering credit to the game on the one provided mobile computing device related to the generated code;

permitting play of the wagering game on the one provided mobile computing device responsive to wagers made using the applied credit;

transmitting on the network data related to a current activity level of each mobile computing device to a computer system;

tracking the current activity level of each of the mobile computing devices so provided at the computer system, comprising determining how long each mobile computing device is idle for longer than a predefined time;

varying the predefined time as a function of how many mobile computing devices are provided; and sending a message over the network to one of the provided mobile computing devices when the current activity level falls below a predefined level.

2. The method of claim 1 further comprising:

continuing to track the current activity level of the one mobile computing device; and generating an indication that the current activity level fails to meet at least one predefined criterion.

3. The method of claim 2 wherein generating an indication that the current activity level fails to meet at least one predefined criterion comprises dispatching a person to the one mobile computing device.

4. The method of claim 1 wherein the predefined time is longer when fewer mobile computing devices are provided and shorter when more mobile computing devices are provided.

5. The method of claim 1 wherein the message indicates to the player that he or she should play a game on the mobile computing device.

6. The method of claim 1 wherein an operator terminal is connected to the network and the method further comprises:

displaying an entry for each mobile computing device provided; and displaying indicia associated with at least one of the provided mobile computing devices indicating time between games played on the at least one provided mobile computing device.

7. The method of claim 6 wherein the indicia comprises one of a plurality of colors for the entry.

8. The method of claim 1 further comprising deducting wagers that resulted in a loss from the applied credit to produce a credit balance.

9. The method of claim 8 further comprising applying prizes that resulted from a win to the applied credit thereby augmenting the credit balance.

10. The method of claim 9 further comprising tracking the credit balance at a location remote from the mobile computing device.

11. The method of claim 10 further comprising accounting for a withdrawal of the credit balance.

12. The method of claim 11 wherein accounting for a withdrawal of the credit balance comprises receiving an image of the generated code at a cashier's terminal.

13. The method of claim 12 wherein the method further comprises providing a sheet of material to the player having the image of the generated code thereon and wherein receiving an image of the generated code via the camera at one of the mobile computing devices comprises reading the code from the sheet when the player presents the sheet to the camera.

* * * * *